United States Patent [19]
Miyashita et al.

[11] Patent Number: 5,845,620
[45] Date of Patent: Dec. 8, 1998

[54] IGNITION TIMING CONTROL SYSTEM FOR INTERNAL COMBUSTION ENGINE

[75] Inventors: Kotaro Miyashita; Shuichi Takagi; Yoshio Yamamoto; Yoshihisa Hara; Hiroshi Ikeba, all of Wako, Japan

[73] Assignee: Honda Giken Kogyo Kabushiki Kaisha, Tokyo, Japan

[21] Appl. No.: 366,730

[22] Filed: Dec. 30, 1994

[30] Foreign Application Priority Data

Dec. 30, 1993 [JP] Japan .................................. 5-351149

[51] Int. Cl.⁶ .................................................. F02P 5/152
[52] U.S. Cl. ........................ 123/412; 123/421; 123/425
[58] Field of Search .................................. 123/425, 412, 123/422, 421, 418

[56] References Cited

U.S. PATENT DOCUMENTS

| 4,594,982 | 6/1986 | Takahashi et al. ........... | 123/425 |
| 5,000,149 | 3/1991 | Miyama ....................... | 123/425 |
| 5,012,782 | 5/1991 | Tokuda ........................ | 123/425 |

FOREIGN PATENT DOCUMENTS

| 2-40082 | 2/1990 | Japan . |
| 2-275043 | 11/1990 | Japan . |
| 4-4468 | 1/1992 | Japan . |
| 2 234 292 | 1/1991 | United Kingdom . |

OTHER PUBLICATIONS

Patent Abstracts of Japan, vol. 11, No. 323 (M-634), Oct. 21, 1987, JP 62-107274, May 18, 1987 (Yoshihisa).
Patent Abstracts of Japan, vol. 16, No. 328 (M-1281), Jul. 16, 1992, JP 4-94460, Mar. 26, 1992 (Masaki et al).
Patent Abstracts of Japan, vol. 16, No. 107 (M-1222), Mar. 17, 1992, JP 3-279651, Mar. 28, 1990 (Masanobu).
Patent Abstracts of Japan, vol. 16, No. 339 (M-1284), Jul. 22, 1992, JP 4-101067, Aug. 11, 1990 (Yukio et al).
Patent Abstracts of Japan, vol. 15, No. 35 (M-1074), Jan. 28, 1991, JP 2-275043, Apr. 18, 1989 (Kishiyu).

*Primary Examiner*—Andrew M. Dolinar
*Attorney, Agent, or Firm*—Nikaido, Marmelstein, Murray & Oram LLP

[57] ABSTRACT

An ignition timing control system for an internal combustion engine that estimates the octane number of the fuel being used based on the state of engine combustion knocking and controls the ignition timing to a value not exceeding the knocking limit. The basic ignition timing is set along the knocking limit of fuel having least octane number and the maximum advance amount is set between the knocking limit and the second knocking limit of fuel having maximum octane number. Octane number is estimated from the occurrence of knocking. On the other hand, upper limit of the estimated octane number is set based on the MBT of the engine such that the estimated octane number is limited with the upper limit. Advance rate is determined based on the estimated octane number and is multiplied to the maximum advance amount to determine an ignition timing correction amount. The ignition timing is finally determined from the basic ignition timing and the ignition timing correction amount. A learning control is conducted for the octane number estimated and the estimated octane number is limited within the learned value.

58 Claims, 18 Drawing Sheets

FIG. 6A
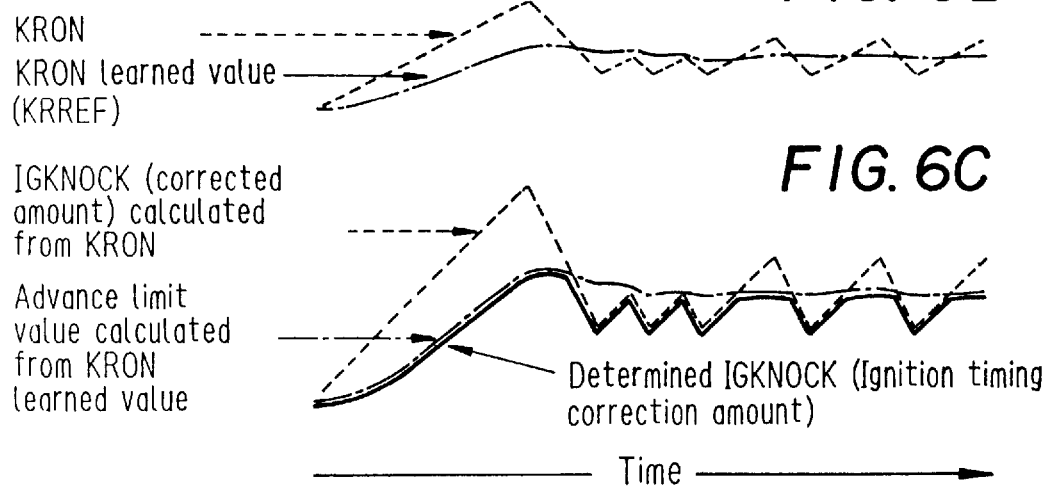

→ High load

|  PBK<br>NE | PBKC0 | PBKC1 | ... | PBKC8 | PBKC9 |
|---|---|---|---|---|---|
| NEKC0 | . | . | ... | . | . |
| NEKC1 | . | . | ... | . | . |
| NEKC2 | . | . | ... | . | . |
| . | . | . | . | . | . |
| . | . | . | . | . | . |
| . | . | . | . | . | . |
| NEKC19 | . | . | ... | . | . |

↓ High speed

IGNITION TIMING CONTROL SYSTEM FOR INTERNAL COMBUSTION ENGINE

BACKGROUND OF THE INVENTION

1. Field of the Invention

This invention relates to an ignition timing control system for internal combustion engines, more particularly to an ignition timing control system for vehicle internal combustion engines that estimates the octane number of the fuel being used based on the state of engine knocking and controls the ignition timing to an optimum value not exceeding the knocking limit.

2. Description of the Prior Art

Japanese Patent Publication No. Hei 4(1992)-4468 teaches an ignition timing control system which establishes two sets of ignition timing characteristics corresponding to two types of fuel with high and low octane numbers and selects the appropriate set of characteristics according to the octane number of the fuel being used.

In this prior art system, the ignition timing is selected between a first set of ignition timing characteristics prescribing the knocking limit on the high octane number side and a second set of ignition timing characteristics prescribing the knocking limit on the low octane number side. In some engines, however, the knocking limit on the high octane number side is more advanced than the MBT (maximum spark advance for best torque) during low-load operation. Therefore, setting the ignition timing of such an engine based on the high octane number side characteristics so as to avoid knocking results in an unnecessary loss of engine output power. As a result, it becomes impossible to obtain the full potential power of the engine.

One object of the present invention is therefore to provide an ignition timing control system for internal combustion engines for overcoming the aforesaid problems of the conventional system, more specifically to provide an ignition timing control system which estimates the octane number of the fuel being used based on the state of engine knocking and decides the ignition timing so as not to exceed the knocking limit, thereby maximizing engine output utilization.

On the other hand, Japanese Laid-open Patent Publication No. Hei 2(1990)-40082 teaches a system using learning control for deciding an ignition timing control value. In this prior art system, values in the retard direction update the learned value even outside the learning region so as to prevent control delay.

A second object of the invention is therefore to provide an ignition timing control system for internal combustion engines which incorporates learning control into the octane number estimation, estimates the octane number of the fuel being used based on the state of engine knocking, decides the ignition timing so as not to exceed the knocking limit, and optimally learns the estimated octane number.

In this type of control, moreover, the knocking sensor output increases as the ignition timing is decided farther toward the advance side. Sufficient correction of the ignition timing in the advance direction therefore becomes impossible owing to erroneous detection of knocking even though none has occurred. This is another reason for not being able to utilize the full power potential of the engine.

A third object of the invention is therefore to provide an ignition timing control system for internal combustion engines which estimates the octane number of the fuel being used based on the state of engine knocking, accurately detects the occurrence of knocking, and optimally decides the ignition timing so as not to exceed the knocking limit.

Furthermore, internal combustion engines are not always operated under standard atmospheric conditions.

A fourth object of the invention is therefore to provide an ignition timing control system for internal combustion engines which estimates the octane number of the fuel being used based on the state of engine knocking and optimally decides the ignition timing so as not to exceed the knocking limit irrespective of the altitude at which the internal engine is being operated.

SUMMARY OF THE INVENTION

This invention achieves these objects by providing a system for controlling ignition timing of an internal combustion engine, comprising engine operating condition detecting means for detecting operating condition of the engine at least including engine speed and engine load, knocking detecting means for detecting a combustion knocking occurring in the engine, basic ignition timing determining means for determining a basic ignition timing IGBASE of the engine based on the detected engine operating condition, octane number estimating means for estimating octane number KRON of fuel being supplied to the engine based on the detected engine operating condition and the detected combustion knocking, octane number upper limit value calculating means for calculating an upper limit value KRMBT of the estimated fuel octane number KRON based on the detected engine operating condition, octane number determining means for comparing the estimated octane number KRON with the upper limit value KRMBT to determine a final fuel octane number KRACT in response to the estimated octane number KRON when the estimated octane number KRON is found to be at a side lesser than the upper limit value KRMBT in octane number, while determining the final fuel octane number KRACT in response to the upper limit value KRMBT when the estimated octane number KRON is found to be at a side greater than upper limit value KRMBT in octane number, ignition timing correction amount calculating means for calculating an ignition timing correction amount IGKNOCK at least based on the determined final fuel octane number KRACT and ignition timing determining means for correcting the basic ignition timing IGBASE at least by the ignition timing correction amount IGKNOCK to determine a final ignition timing θIG of the engine.

BRIEF EXPLANATION OF THE DRAWINGS

These and other objects and advantages of the invention will be more apparent from the following description and drawings, in which:

FIG. 6 is a timing chart showing the ignition timing control according to the present invention;

DETAILED DESCRIPTION OF PREFERRED EMBODIMENTS

Figure 1:
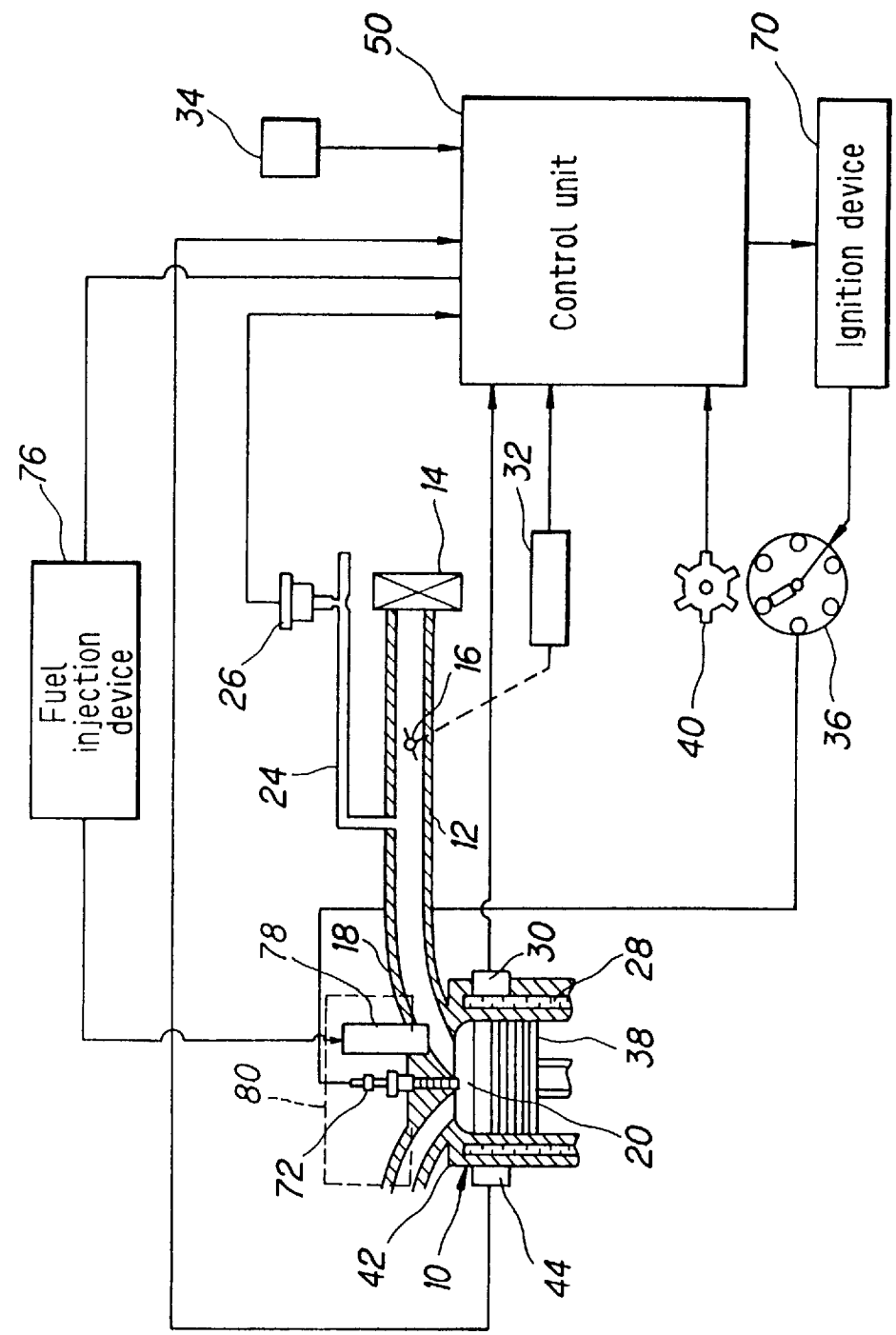
FIG. 1 is an explanatory view showing an ignition timing control system of an internal combustion engine according to the present invention.

An embodiment of the invention will now be explained with reference to the drawings. FIG. 1 shows the overall arrangement of an ignition timing control system for internal combustion engines in accordance with this invention.

Reference numeral 10 in this figure designates a multi-cylinder (six-cylinder) internal combustion engine for powering a vehicle. Air flowing in through an air cleaner 14 has its flow rate controlled by a throttle valve 16 and passes through a manifold 18 to a combustion chambers 20 (only one shown). A pipe 24 branches off from the air intake passage 12 at an appropriate position downstream of the throttle valve 16. The pipe 24 is provided near its far end with a manifold absolute pressure sensor 26 which detects the engine load by measuring the absolute value of the intake air pressure.

A coolant temperature sensor 30 is provided in the vicinity of a coolant passage 28 of the internal combustion engine 10 for detecting the temperature of the engine coolant and a throttle position sensor 32 is provided at an appropriate location near the throttle valve 16 in the air intake passage 12 for detecting the amount of throttle opening. An atmospheric pressure sensor 34 is provided at an appropriate place on the internal combustion engine 10 for detecting the atmospheric pressure where the engine is operating.

A distributor 36 installed near the internal combustion engine 10 accommodates therein a crank angle sensor 40 comprised of a magnet which rotates in synchronism with a crankshaft (not shown) rotated by the reciprocal motion of pistons 38 (only one shown) and a member stationarily disposed opposite the magnet. The crank angle sensor 40 outputs a pulse signal once every predetermined angle of crankshaft rotation. At an appropriate location on a cylinder block 42 of the internal combustion engine 10 is provided a piezoelectric knocking sensor 44 for detecting vibration produced by knocking arising within the combustion chambers 20. The outputs of the manifold absolute pressure sensor 26 and the other sensors 30, 32, 34, 40 and 44 are forwarded to a control unit 50.

Figure 2:
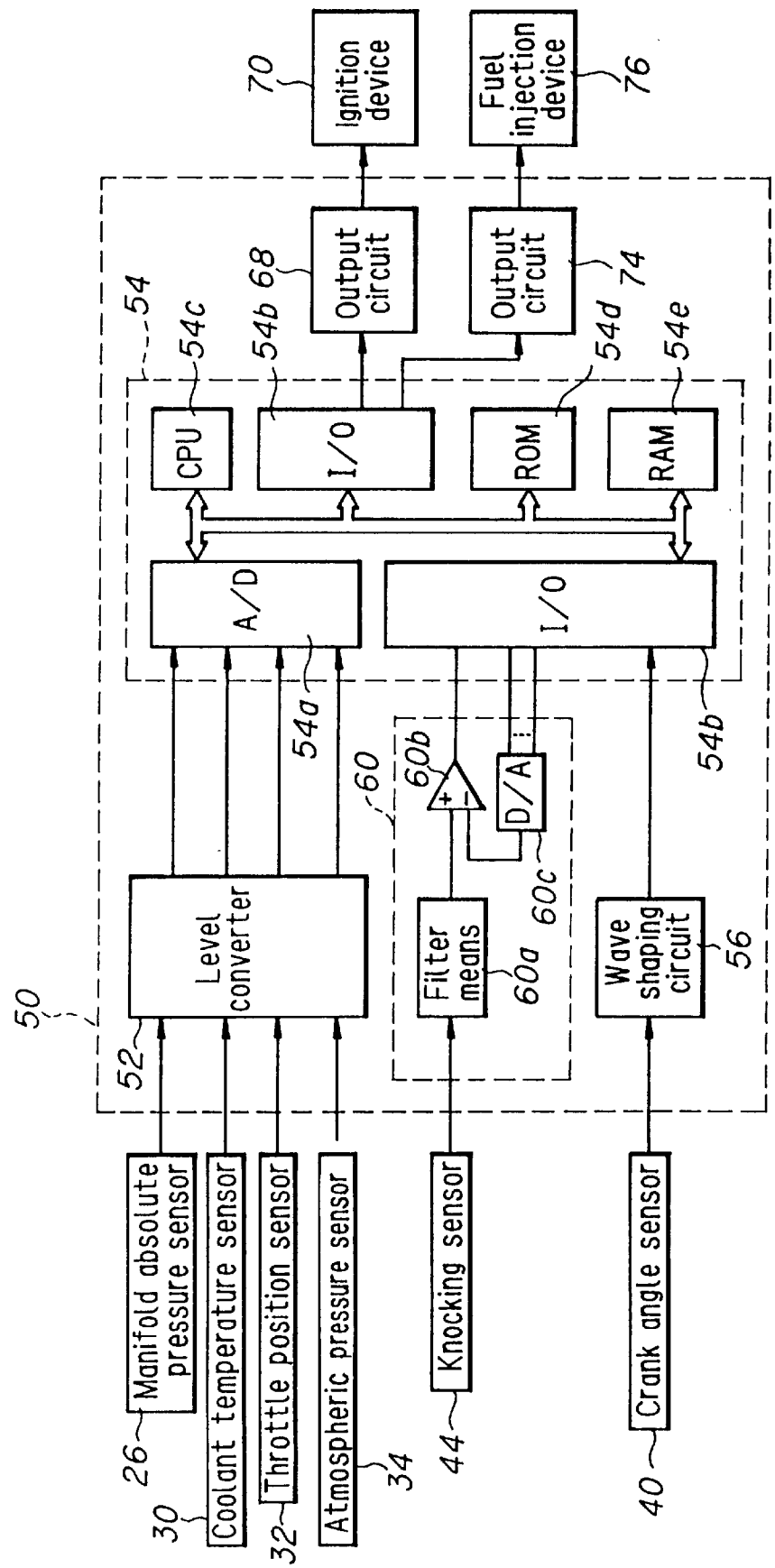
FIG. 2 is a block diagram showing the arrangement of a control unit illustrated in FIG. 1 in detail.

The arrangement of the control unit 50 is illustrated in FIG. 2. The analog outputs from the manifold absolute pressure sensor 26 etc. are input to a level converter 52 in the control unit 50 for adjustment to a prescribed level and are then forwarded to a microcomputer 54. The microcomputer 54 comprises mainly of an A/D converter 54a, an I/O circuit 54b, a CPU (central processing unit) 54c, a ROM (read-only memory) 54d and a RAM (random access memory) 54e. The signals output by the level converter 52 are converted to digital values by the A/D converter 54a in accordance with commands from the CPU 54c and are then temporarily stored in the RAM 54e. The output of the crank angle sensor 40 is shaped in a wave shaping circuit 56 and then input to the microcomputer 54 through the I/O circuit 54b.

After being sent to the control unit 50, the output from the knocking sensor 44 is input to a knocking detection circuit 60. The knocking detection circuit 60 comprises a filter means 60a, a comparator means 60b and a D/A conversion means 60c. The occurrence of knocking is detected in the comparator means 60b by comparing a reference value received from the microcomputer 54 through the D/A conversion means 60c with the sensor output value received through the filter means 60a.

As will be explained in detail later, the CPU 54c of the microcomputer 54 calculates the engine speed and the like from the output of the crank angle sensor 40, discriminates the engine load state from the output of the manifold absolute pressure sensor 26 and calculates the ignition timing accordingly, decides the final ignition timing by appropriately correcting the calculated ignition timing in light of knocking occurrence, issues an ignition command via an output circuit 68 to an igniter or other such ignition device 70, thereby causing a spark plug 72 of a prescribed cylinder selected by the distributor 36 to fire and ignite the air-fuel mixture in the associated combustion chamber 20. The CPU 54c also decides a fuel injection control value based on the engine speed and the engine load and outputs this value through a second output circuit 74 to a fuel injection device 76 for supplying fuel to the combustion chamber 20 through a fuel injection valve 78 shown in FIG. 1.

Moreover, the engine is equipped with a variable valve timing mechanism 80 which varies open/close timings and lift amounts of intake and exhaust valves (neither shown) between two modes (low and high-speed modes) in response to the engine speed and manifold absolute pressure. Since the mechanism is described in Japanese Laid-open Patent Publication No. Hei 2(1990)-275043, for example, further explanation is omitted here.

Figure 3:
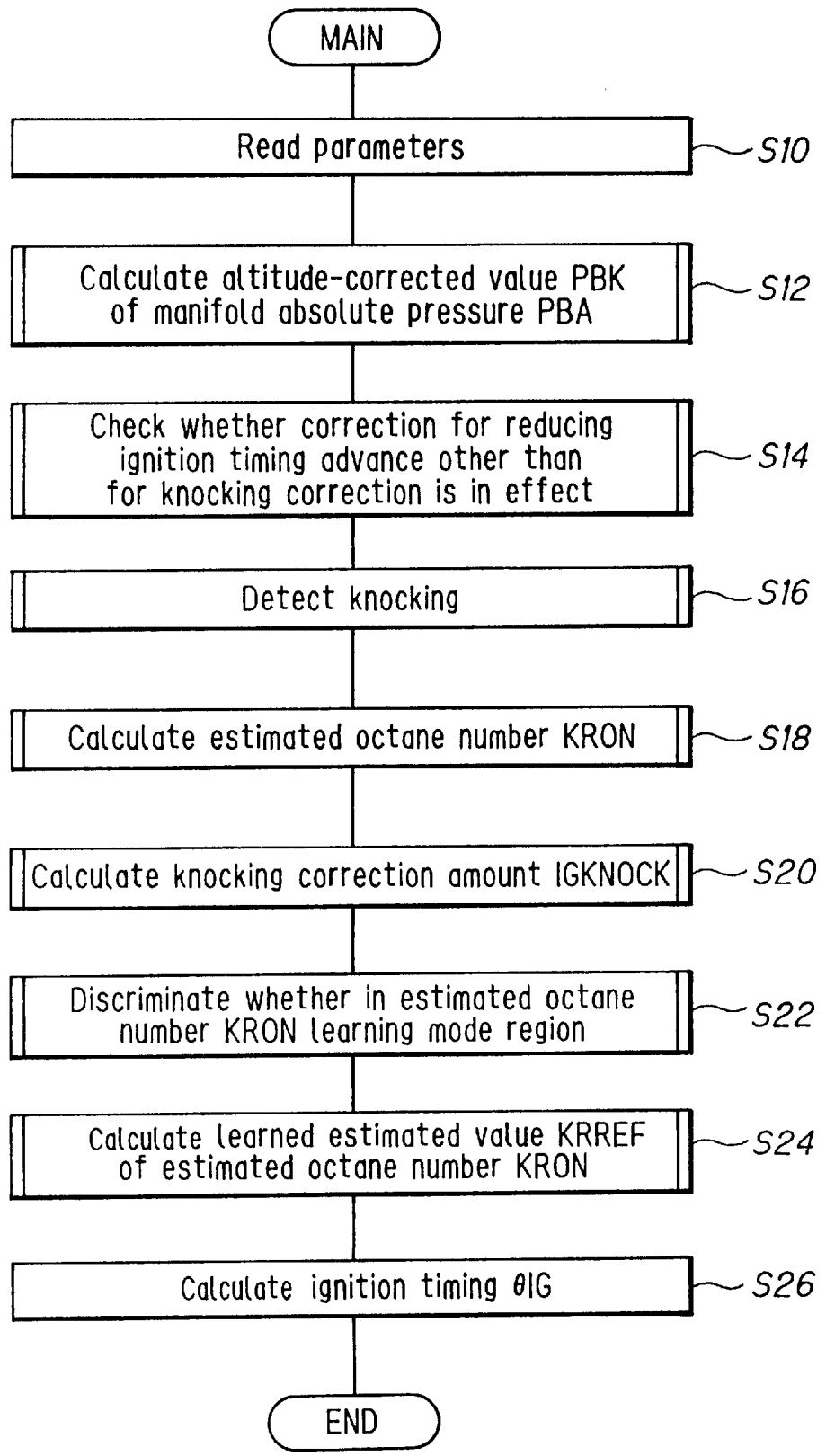
FIG. 3 is a main flow chart showing the operation of the control system illustrated in FIG. 1.

The operation of the control system will now be explained with reference to the flow charts, beginning with FIGS. 3. The flow chart of FIG. 3 represents the main program for ignition timing control according to this invention and is activated once every prescribed crank angle.

Before explaining FIG. 3, however, the main features of the ignition timing control according to the invention will be explained briefly starting with FIG. 4.

Figure 4:
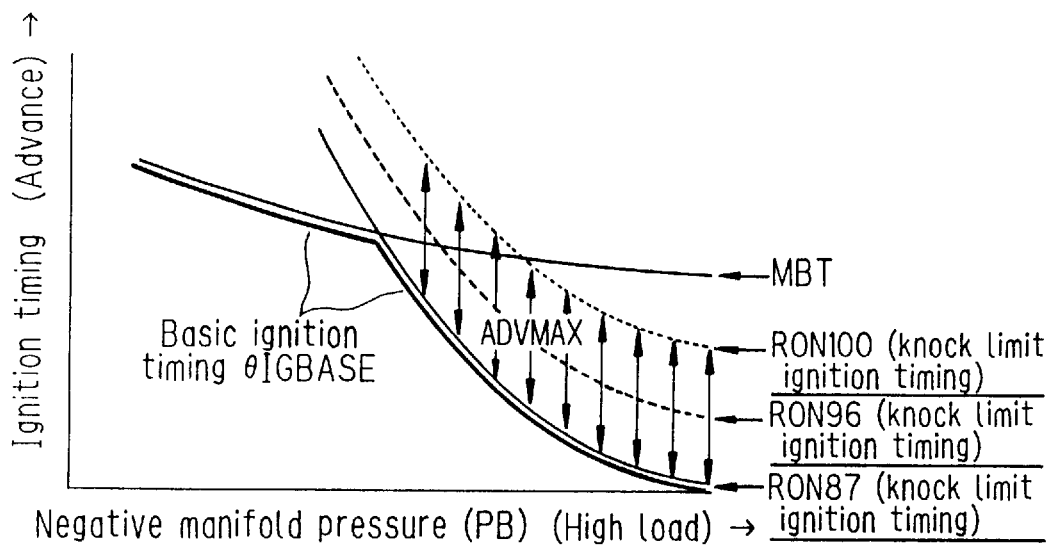
FIG. 4 is a graph showing the knocking limits of a group of fuels whose octane numbers are estimated in the control according to the invention and a relationship between the knocking limits and the MBT of the engine.
Figure 5:
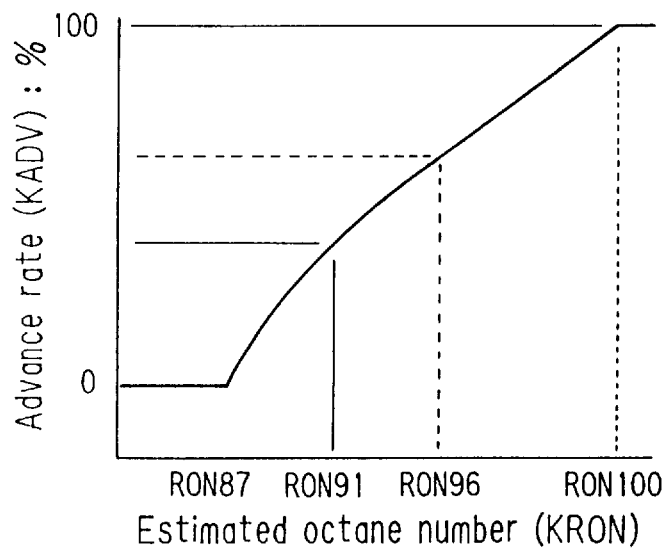
FIG. 5 is a graph showing a relationship between an ignition timing advance rate and the fuel octane numbers when the knocking limit ignition timing difference between that of least octane number and that of maximum octane number is assumed to be 100%.

FIG. 4 is a graph showing the knocking limits of a group of fuels whose octane numbers are estimated in the control according to this invention. (It should be noted that engine speed has been ignored in the interest of simplicity and the manifold pressure is expressed here as negative pressure.) Where the knocking limit ignition timing difference ADV-MAX between RON 87 (lowest octane number fuel; RON is an abbreviation for Research Octane Number) and RON 100 (highest octane number fuel) is defined as 100%, the relationship between the advance rate KADV and the fuel octane number can be expressed as shown in FIG. 5. Thus if an estimated octane number KRON of the fuel being used can be determined based on the presence/absence of knocking, then by calculating the corresponding advance rate KADV it becomes possible to calculate the ignition timing knocking correction amount IGKNOCK as follows $$IGKNOCK = KADV \times ADVMAX$$

In the ignition timing control according to this invention, the knocking limit ignition timing of the lowest octane number fuel (RON 87) is defined as the basic ignition timing and the ignition timing at which knocking can be avoided is determined from the estimated octane number and the knocking limit ignition timing difference.

One characteristic of the control system according to this invention is that, as shown in FIG. 6, the estimated octane number KRON is combined with a learned control value KRREF to enable instantaneous optimization of the ignition timing curve in the vicinity of the knocking limit while at the same time avoiding knocking. More specifically, the control system calculates the knocking correction amount IGKNOCK from the estimated octane number KRON and obtains the learned control value KRREF. It then compares the knocking correction amount IGKNOCK with the learned control value KRREF and restrains the ignition timing advance to the learned value if the knocking correction amount IGKNOCK is more advanced than the learned value.

Another characteristic of the control system is that the ignition timing is set so as not to exceed the MBT curve in the direction of ignition timing advance. The MBT curve is determined by engine specification. An example is shown in FIG. 4. (As in the earlier case of the ignition timing, the MBT characteristics relative to engine speed have been ignored here.) Although the MBT curve differs from one engine to another, during low-load operation it is generally located farther in the direction of retarded ignition timing than the knocking limit. In the control according to this invention, therefore, the basic ignition timing θIGBASE is set as shown in FIG. 4 and the ignition timing is decided so as not to exceed the MBT curve in the direction of ignition timing advance, thus preventing unnecessary loss of engine output.

In S10 of the flow chart of FIG. 3, the manifold absolute pressure PBA, engine speed NE and other parameters required for the processing in the following steps are read.

Next, in S12, the manifold absolute pressure PBA just read is corrected for altitude. As differences in air density with changes in atmospheric conditions at the place where the engine is operating affect the charging efficiency, the engine load value detected by the sensor (the manifold absolute pressure sensor 26 in the present embodiment) does not indicate the actual engine load. Therefore, since the control according to this embodiment estimates the octane number based on the actual operating conditions including the manifold absolute pressure, the information required for octane number estimation is not available and the ignition timing cannot be optimized when, for example, the engine is operating in the high-load knocking zone while being used at a high altitude. To eliminate this problem, the manifold absolute pressure is corrected for altitude.

Figure 7:
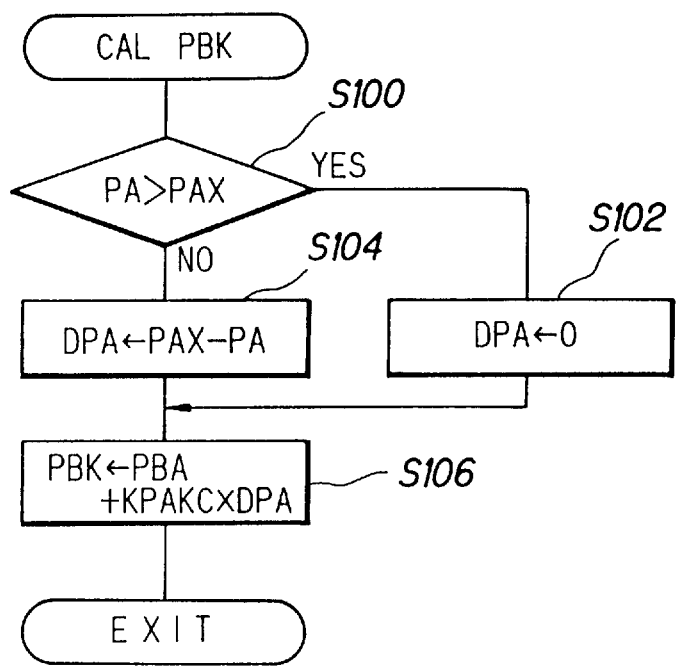
FIG. 7 is a flow chart showing the subroutine of the main flow chart for correcting the manifold absolute pressure by the altitude where the engine is operating.
Figure 8:
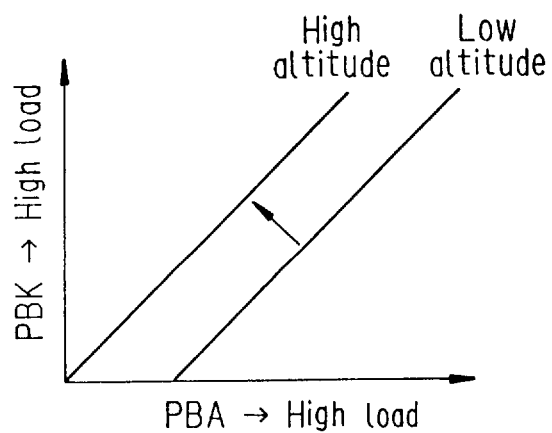
FIG. 8 is a graph showing the characteristics of the altitude correction of the manifold absolute pressure in FIG. 7.

FIG. 7 shows a subroutine for this purpose. In S100 a check is made as to whether or not the detected atmospheric pressure PA exceeds a prescribed value PAX (an equivalent air pressure value of a level appropriate for classifying the actual air pressure as high or low). If the result is affirmative, the location is judged to be at a low altitude and a value DPA (explained later) is set to 0 in S102. If the result is negative, the location is judged to be at a high altitude, the difference between the prescribed value PAX and the detected atmospheric pressure is calculated in S104 and the result is used as the value DPA. Then in S106 the product of the value DPA and a correction coefficient KPAKC (a fixed value such as 0.5) is added to the detected manifold absolute pressure PBA for correcting it (the corrected manifold absolute pressure being referred to as PBK). Thus, as shown in FIG. 8, the manifold absolute pressure is corrected upward at high altitudes.

Next, in S14 of the flow chart of FIG. 3, a check is made as to whether or not any correction control for reducing the amount of ignition timing advance other than that for knocking correction is in effect. This is for minimizing interference with other types of correction control for reducing ignition timing advance.

Figure 9:
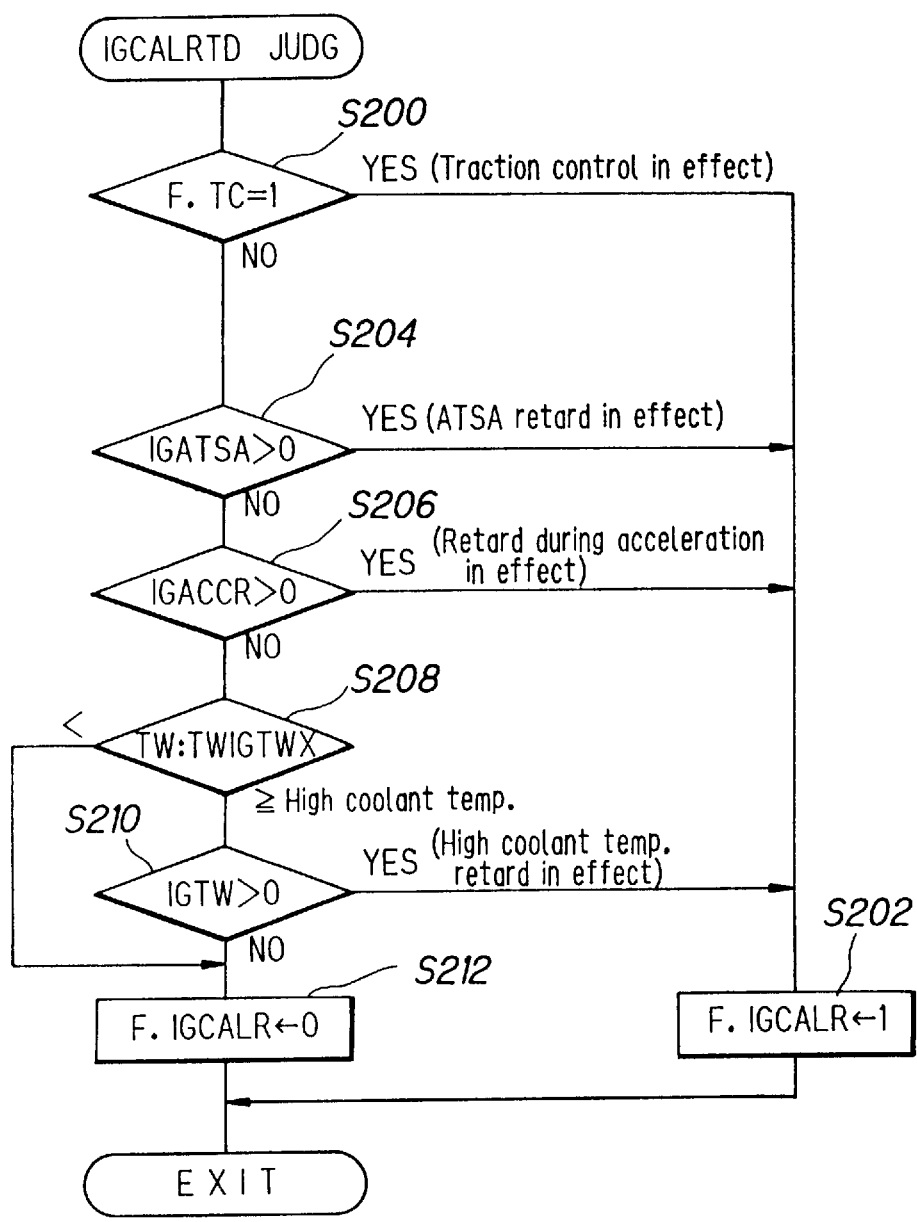
FIG. 9 is a flow chart showing the subroutine of the main flow chart for determining if any correction control for reducing the amount of ignition timing advance other than that for knocking correction is in effect.

FIG. 9 shows a subroutine for this task. In S200 a check is made as to whether or not the bit of a flag F.TC is set to 1. The bit of this flag is set to 1 when control is being conducted by a traction control routine (not shown). If the result is affirmative in S200, the bit of another flag F.IG-CALR is set to 1 in S202 for indicating that correction control for reducing the amount of ignition timing advance other than that for knocking correction is in effect.

If the result in S200 is negative, a check is made in S204 as to whether or not an advance reduction correction amount IGATSA set in another subroutine (not shown) for lowering gear shift shock is present. If the result is affirmative, the bit of the aforesaid flag is set to 1 in S202. If negative, a check is made in S206 as to whether or not an advance reduction correction amount IGACCR for reducing swaying oscillation owing to engine output transmission lag is present. If the result is affirmative, the bit of the aforesaid flag is set to 1 in S202.

If the result in S206 is negative, the detected coolant temperature TW is compared with a prescribed value TWIGTWX in S208. If it is higher, the coolant temperature is judged to be at or above a prescribed high level and a check is made in S210 as to whether or not a high-coolant temperature knocking prevention retard correction amount IGTW is present. If the result is affirmative, the bit of the aforesaid flag is set to 1 in S202. If negative, the flag bit is set to 0 in S212. If the result in S208 is negative, the subroutine skips S210 and goes directly to S212.

Returning to the flow chart of FIG. 3, knock detection is conducted in S16.

Figure 10:
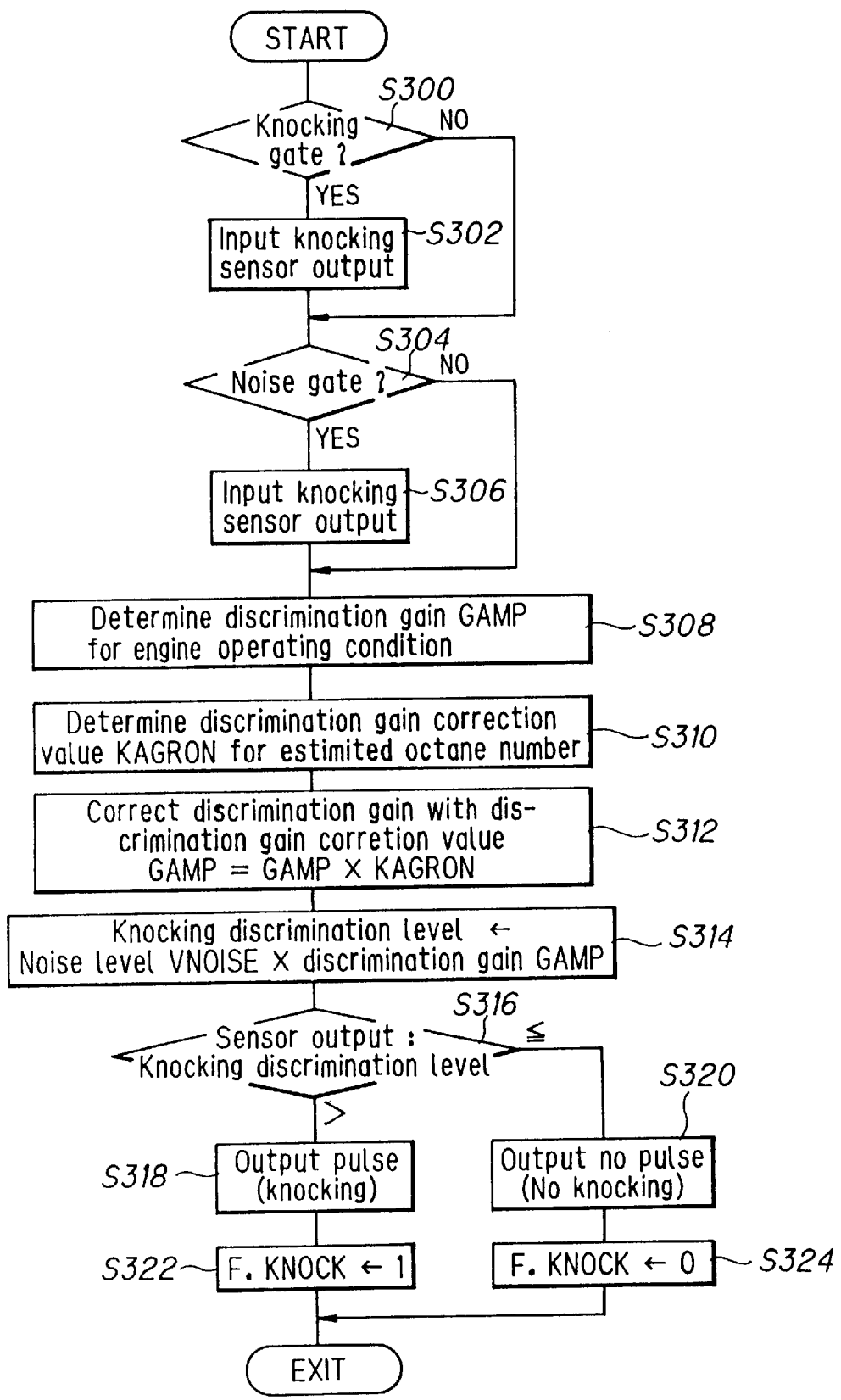
FIG. 10 is a flow chart showing the subroutine of the main flow chart for detecting knocking.
Figure 11:
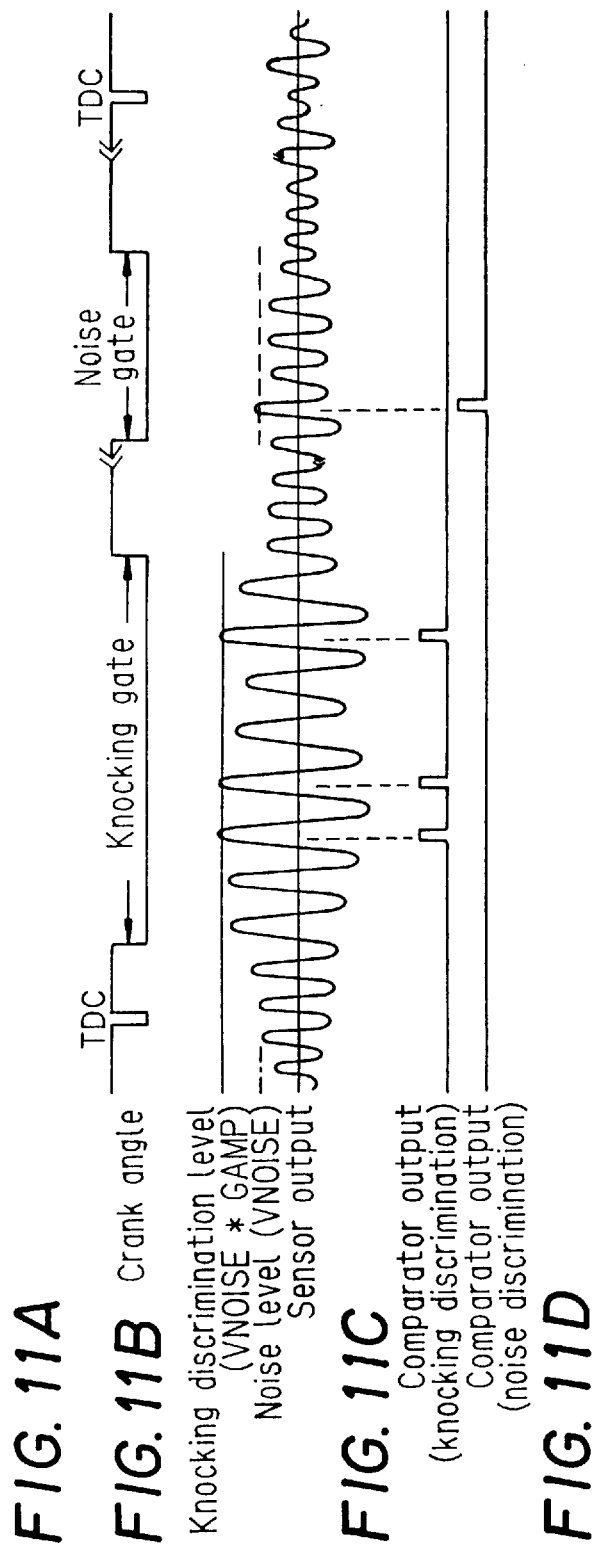
FIG. 11 is a timing chart showing the knocking detection in FIG. 10.

FIG. 10 shows a subroutine for this task. In S300 a check is made as to whether or not the crank angle is in the knocking gate region. As shown in FIG. 11, a knocking gate and a noise gate are established over specific crank angle ranges between adjacent TDCs. The knocking gate is the crank angle region for detecting presence/absence of knocking and the noise gate is the crank angle region for producing the discrimination level required for the detection. During the noise gate, a knocking discrimination level is determined by sending the output of the knocking sensor 44 to the comparator means 60b through the filter means 60a and comparing it with a reference value received by the comparator means 60b from the microcomputer 54 through the D/A conversion means 60c. The comparator means 60b compares the sensor output (filter output) received during the knocking gate with the knocking discrimination level and outputs a pulse if the sensor output is greater.

If the result in S300 of the flow chart of FIG. 10 is affirmative, the sensor output is sent to the comparator means 60b in S302, as just explained, and a check is then made in S304 as to whether or not the crank angle is in the noise gate. If the result in S304 is affirmative, the sensor output is input to the comparator means 60b in S306. Since the knocking gate and the noise gate have different crank angles, there is no possibility of the sensor output being input to the comparator means 60b in both S302 and S306 at the start of the subroutine of FIG. 10.

Next, in S308, a discrimination gain GAMP for use under the current operation condition is retrieved from a map. As shown in FIG. 11, the knocking discrimination level is calculated as the product of a noise level VNOISE and the discrimination gain GAMP. In S308 the discrimination gain GAMP corresponding to the operating condition is retrieved from a map. This map is explained in the diagram of FIG. 12. Specifically, the engine speed NE and the altitude-corrected manifold absolute pressure PBK are used as address data for the retrieval. As shown, the discrimination gain GAMP increases with increasing engine load and increasing engine speed.

Figures 12, 13:
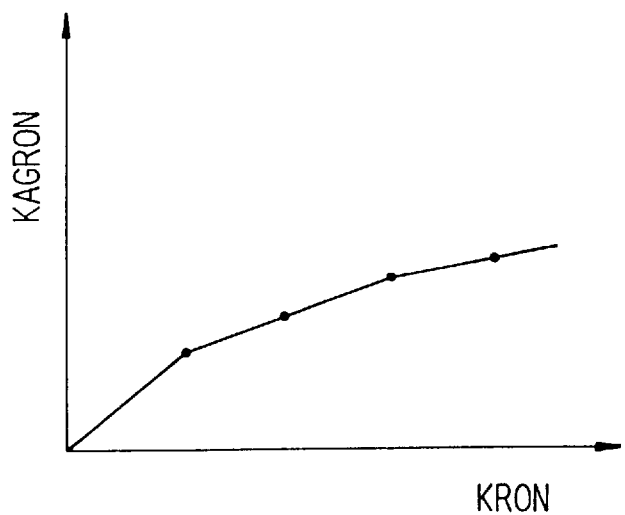
FIG. 12 is an explanatory view showing the characteristics of a discrimination gain GAMP referred to in FIG. 10.
FIG. 13 is an explanatory view showing the characteristics of a discrimination gain correction value referred to in FIG. 10.

Advancing to S310, a discrimination gain correction value KAGRON for use at the estimated octane number KRON is retrieved from a table. FIG. 13 shows a curve representing the characteristics of this table. As shown, the characteristic curve of the discrimination gain correction value KAGRON is such that the value of KAGRON increases with increasing estimated octane number KRON. (Calculation of the estimated octane number KRON will be explained later.)

Moving to S312, the discrimination gain GAMP is multiplied by the discrimination gain correction value KAGRON, whereafter the noise level VNOISE is multiplied by the so-corrected discrimination gain GAMP to obtain the knocking discrimination level in S314. The sensor output (filter output) is then compared with the knocking discrimination level in S316. As explained earlier, this is conducted in the comparator means 60b, which outputs (S318) or does not output (S320) a pulse depending on the result of the comparison in the comparator means 60b. The CPU 54c of the microcomputer 54 receives the output of the comparator means 60b, determines the presence/absence of knocking therefrom, sets the bit of a flag F.KNOCK to 1 in S322 if it discovers knocking, and sets the bit of the flag to 0 in S324 if it does not discover knocking.

Returning to the flow chart of FIG. 3, the estimated octane number KRON is calculated in S18.

Figures 14, 15:
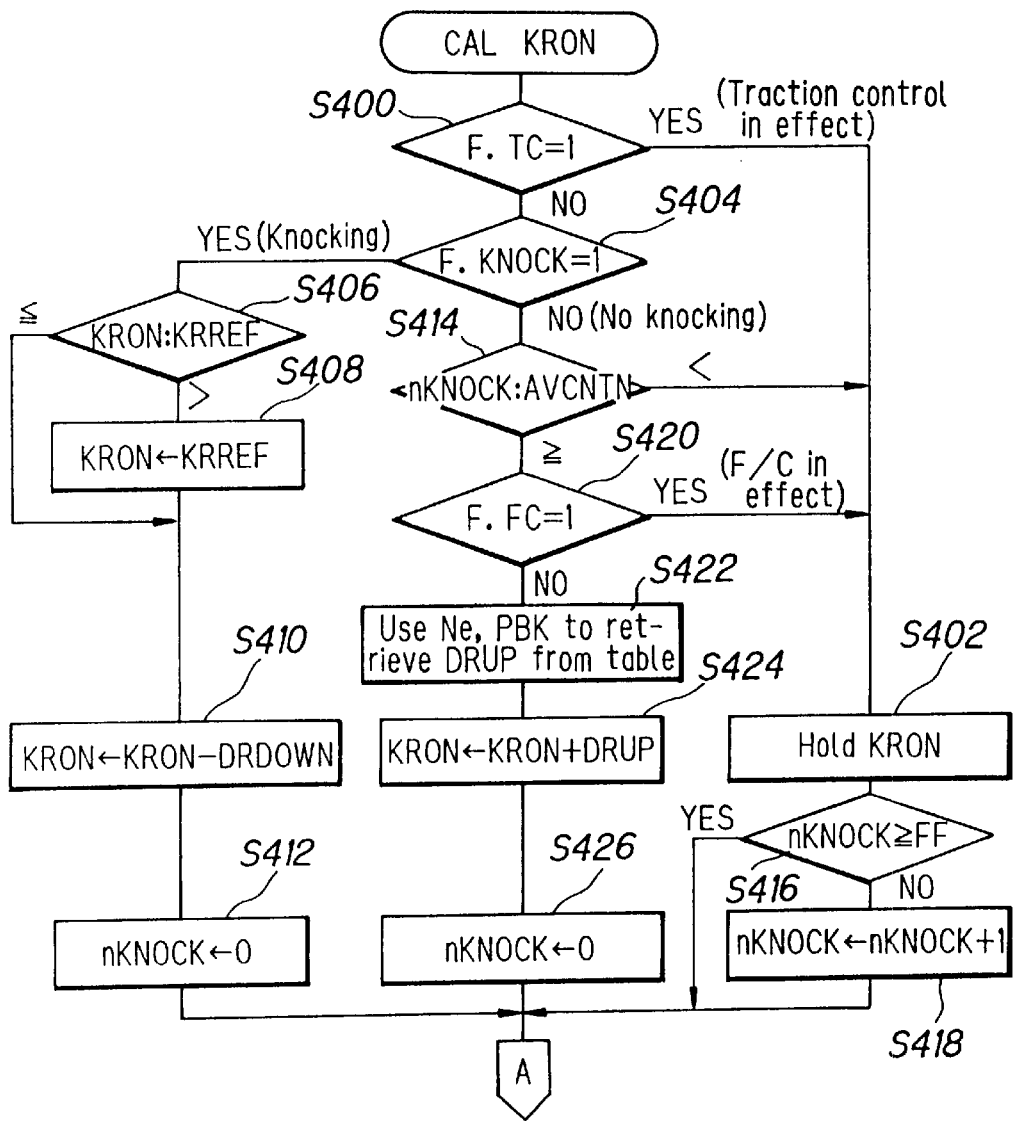
FIG. 14 is the first half of a flow chart showing the subroutine of the main flow chart for calculating an estimated octane number.
FIG. 15 is an explanatory view showing the characteristics of an addition term DRUP referred to in FIG. 14.

FIG. 14 shows a subroutine for this task. In S400 another check is made as to whether or not the bit of the flag F.TC is set to 1 (whether or not traction control is in effect). If the result is affirmative, the estimated octane number KRON is held at that in the preceding cycle in S402, which is to say that estimation of the octane number is suspended. This is to avoid affecting the traction control when it is being implemented.

If the result in S400 is negative, a check is made in S404 as to whether or not the bit of the flag F.KNOCK is set to 1 (whether or not knocking has occurred). If the result is affirmative, the estimated octane number KRON is compared with the learned estimated octane number (learned control value) KRREF in S406. If estimated octane number KRON is greater than the learned estimated octane number KRREF, the learned value is adopted as the estimated value in S408. (The calculation of the learned value will be explained later.) This is for preventing recurrence of knocking by immediately lowering the amount of ignition timing advance to the learned value when knocking occurs at an estimated value exceeding the learned value. (See FIG. 6 discussed earlier.)

Next, in S410, the estimated octane number KRON is reduced by a small value DRDOWN (of, say, 0.75 octane). This downward correction of the estimated value is conducted because the fact that knocking has occurred means that the estimated octane number, more precisely the ignition timing characteristic curve corresponding to the estimated octane number, was erroneously set too far in the advance direction and it is therefore necessary to correct the final ignition timing decided after the knocking correction amount IGKNOCK has been determined from the estimated octane number KRON in the manner described later for reducing the amount of ignition timing advance. When S406 finds that the estimated value is not greater than the learned value, S410 is conducted immediately thereafter. (In this specification, larger values indicate greater ignition timing advance. Subtraction therefore corrects the ignition timing in the direction of less advance (retard), while addition corrects it in the direction of increased advance.) In S412 which follows, the value of a counter nKNOCK is set to 0. This counter counts the number of consecutive firings in which knocking does not occur.

If no knocking is found in S404, the value of the counter nKNOCK is compared with the number of firings waited before advance AVCNTN (four firings, for example) in S414. If the counter value is smaller than AVCNTN, namely if the number of consecutive firings in which knocking did not occur has not reached four, the estimated octane number KRON is held at that in the preceding cycle in S402. If S416 then confirms that the counter value has not reached the upper limit value FF, the counter value is incremented by 1 in S418.

If S414 finds the counter value to be equal to or greater than the number of firings waited before advance, a check is made in S420 as to whether or not the bit of a flag F.FC is set to 1. The bit of this flag is set to 1 when another routine (not shown) has cut off the supply of fuel to the engine (fuel cut). When the result in S420 is affirmative, S402 and the following steps are processed in the manner explained above.

When the result in S420 is negative, the detected engine speed NE and the altitude-corrected manifold absolute pressure PBK are used in S422 to retrieve an estimated octane number addition term DRUP (of, say, about 0.125 octane).

This map is explained in the diagram of FIG. 15, from which it can be seen that the addition term increases with increasing load and decreasing engine speed. The reason for determining this correction term based on the engine speed and the manifold absolute pressure is of course that the ignition timing curve is determined on the basis of these parameters. In S424 which follows, the retrieved addition term is added to the estimated octane number for correcting the estimated value upward. This upward correction of the estimated value is conducted because the fact that knocking did not occur for more than a prescribed number of consecutive firings means that the estimated octane number, more precisely the ignition timing characteristic curve corresponding to the estimated octane number, was erroneously set too far in the advance reduction direction and it is therefore necessary to correct it in the advance direction. The value of the counter is reset to 0 in S426.

Figure 16:
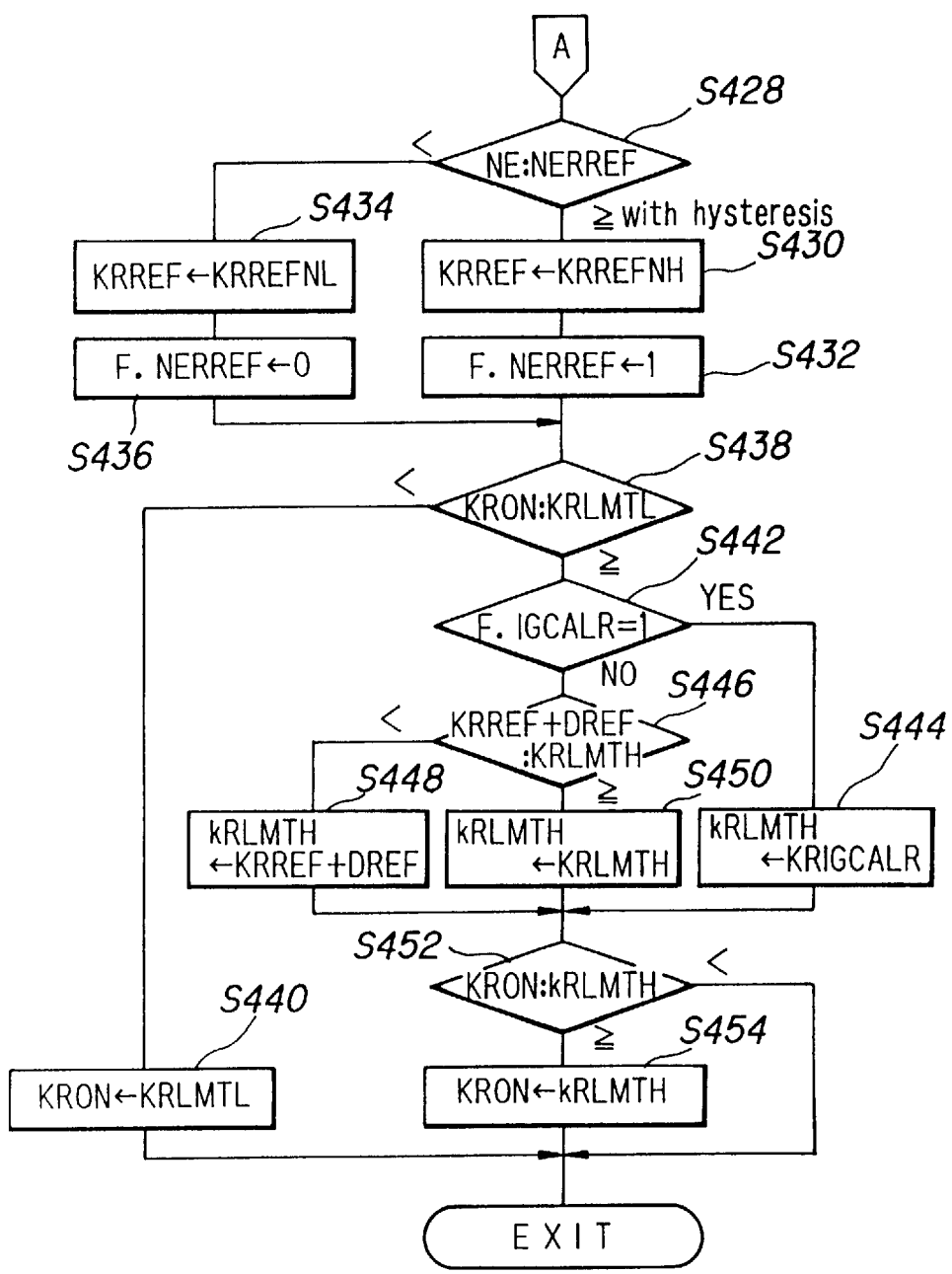
FIG. 16 is the last half of the flow chart of FIG. 14.

Next, in S428 of FIG. 16, the detected engine speed NE is compared with a prescribed engine speed NERREF. If it is found to be equal to or higher than NERREF, the engine speed is judged to be at or above a prescribed high level and the learned estimated octane number KRREF is set to a high-speed side value KRREFNH in S430, whereafter the bit of a flag F.NERREF is set to 1 in S432. If the detected engine speed NE is found to be smaller than the prescribed engine speed NERREF in S428, the learned estimated octane number KRREF is set to a low-speed side value KRREFNL in S434, whereafter the bit of the aforesaid flag is set to 0 in S436. Thus KRREF is set to a different value until the learning operation is completed. Specifically, the octane number is initially set to a high value during low-speed operation so as to increase efficiency and to a relatively low value during high-speed operation so as to enhance durability and reliability, and is thereafter changed according to the engine speed.

Next, in S438, the estimated octane number KRON is compared with a lower limit value KRLMTL (of, say, 87 octane). If it is smaller, the estimated value is set to the lower limit value in S440, while if it is equal to or greater than KRLMTL, another check is made in S442 as to whether or not the bit of the flag F.IGCALR is set to 1 and if it is, the upper limit value KRLMTH of the estimated octane number is set to the value KRIGCALR in S444. This is to ensure that during torque control by ignition timing the torque is not increased or changed by the knocking control, even when a high octane number fuel is being used.

If the result in S442 is negative, a prescribed value DREF (of, say, 0.375 octane) is added to the learned estimated octane number KRREF and the result compared with an upper limit value (of, say, 100.375 octane) in S446. If the increased learned value is found to be smaller than the upper limit value, the upper limit value is set to the increased learned value in S448. If it is found to be equal to or greater than the upper limit value, the upper limit value is set to its preceding value (is left unchanged) in S450. Next, in S452, the estimated octane number is compared with the upper limit value and if it is found to be greater, the estimated value is set to the upper limit value in S454. In other words, when knocking does not occur, the learning speed in the high octane number (ignition timing advance) direction is suppressed by guarding KRON with KRON+DREF so as to prevent KRON from growing markedly with respect to KRREF (learned value).

Returning to the flow chart of FIG. 3, the knocking correction amount IGKNOCK is calculated in S20.

Figure 17:
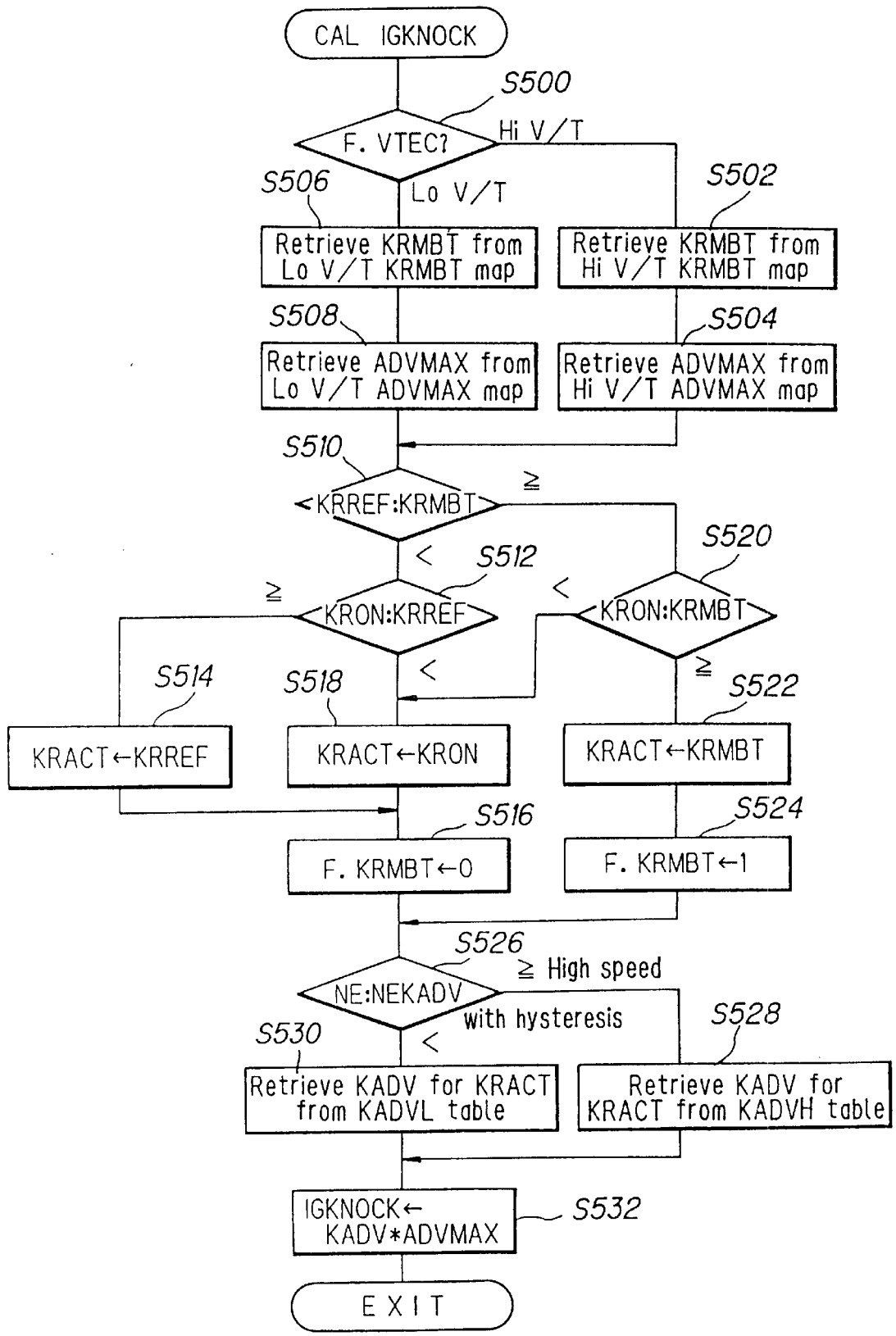
FIG. 17 is a flow chart showing the subroutine of the main flow chart for calculating the knocking correction amount of ignition timing.

FIG. 17 shows a subroutine for this task. In S500 a flag F.VTEC used in a variable valve timing control routine (not shown) is checked for determining whether or not the valve timing is being controlled to either the high or low engine speed side. Variable valve timing control switches the valve timing between two modes depending on whether the engine operating condition is high speed or low speed. As this control is described in Japanese Laid-open Patent Publication No. Hei 2(1990)-275043, as mentioned earlier, it will not be explained in detail here.

Figures 18, 19:
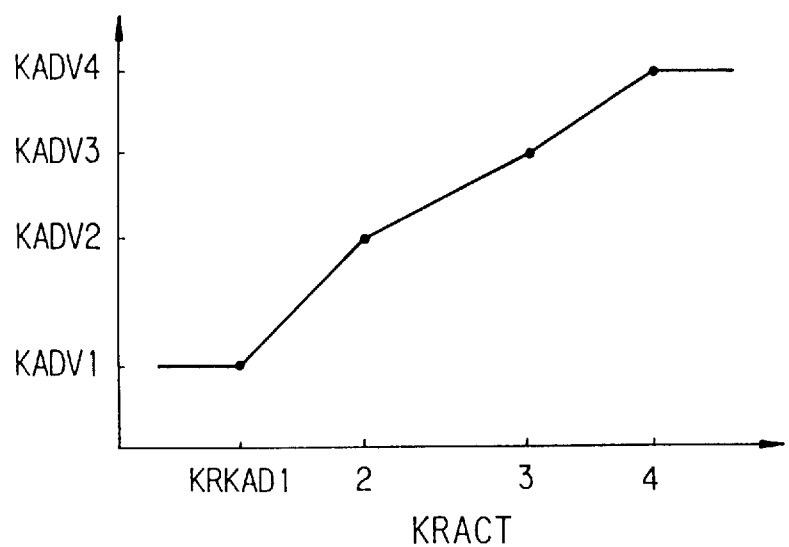
FIG. 18 is an explanatory view showing the characteristics of an upper limit value based on the MBT referred to in FIG. 17.
FIG. 19 is an explanatory view showing the characteristics of an ignition timing advance rate referred to in FIG. 17.

If it is found in S500 that the valve timing is being controlled in the high-speed mode, an upper limit value KRMBT based on the MBT is retrieved from a first map for high-speed mode valve timing control in S502, whereafter the maximum advance amount (knocking limit ignition timing difference) ADVMAX is retrieved from a second map for high-speed mode valve timing control in S504. If it is found in S500 that the valve timing is being controlled in the low speed mode, an upper limit value KRMBT based on the MBT is retrieved from a third map for low-speed mode valve timing control in S506, whereafter the maximum advance amount ADVMAX is retrieved from a fourth map for low-speed valve timing control in S508. The characteristics of the first map are illustrated in the diagram of FIG. 18. As shown, the detected engine speed NE and the altitude-corrected manifold absolute pressure PBK are used as address data for the retrieval. The second to fourth maps, whose characteristics are not shown, can be established to enable retrieval using the same parameters. The foregoing processing is adopted since a feature peculiar to an engine equipped with a variable valve timing mechanism is that the engine possesses both low-speed engine characteristics and high-speed engine characteristics which require separately calculated maximum advance amounts ADVMAX.

Next, the learned estimated octane number KRREF and the so-obtained upper limit value KRMBT based on the MBT are compared in S510. If the learned value is found to be smaller than the upper limit value, the estimated octane number KRON is compared with the learned estimated octane number KRREF in S512. If the estimated value is found to be equal to or greater than the learned value, a final estimated octane number KRACT is set to the learned estimated octane number KRREF in S514, while if the estimated value is found to be smaller than the learned value, the final value is set to the estimated value in S518. The flag F.KRMBT is then reset to 0 in S516.

On the other hand, if in S510 the learned estimated octane number KRREF is found to be equal to or higher than the upper limit based on the MBT, the estimated octane number KRON is compared with the upper limit value KRMBT in S520. If the estimated octane number KRON is found to be equal to or higher than the upper limit value KRMBT, i.e. if the estimated value is found to equal the upper limit value or to exceed it in the direction of ignition timing advance, the final estimated octane number KRACT is set to the upper limit value KRMBT in S522. As explained later, the foregoing is equivalent to the ignition timing exceeding the MBT in the advance direction and the processing described is conducted for avoiding unnecessary loss of engine output as a result. The bit of the flag F.KRMBT is then set to 1 in S524. If the estimated value is found to be smaller than the upper limit value in S520, similar processing to that described above is conducted from S518.

Next the detected engine speed NE is compared with a prescribed engine speed NEKADV in S526. If it is found to be equal to or higher than prescribed engine speed NEKADV, the engine speed is judged to be at or above a prescribed high level and the advance rate KADV is retrieved from a first KADV table using the final estimated octane number KRACT in S528. If the detected engine speed is found to be smaller than the prescribed engine speed in S526, the advance rate KADV is retrieved from a second KADV table using the final estimated octane number KRACT in S530. FIG. 19 shows a curve representing the characteristics of the first KADV table. As shown, the advance rate KADV increases with increasing final estimated octane number KRACT. Although not shown, the second KADV table exhibits a similar curve. Next, in S532, the product of the maximum advance amount ADVMAX and the retrieved advance rate KADV is output as the knocking correction amount IGKNOCK. This agrees with what was explained earlier with reference to FIG. 4 etc. The foregoing processing is conducted because the knocking limit characteristics at a given octane number may vary with engine speed so that even for the same octane number different advance rates may be necessary on the low and high engine speed sides.

Returning to the flow chart of FIG. 3, a discrimination is made in S22 as to whether or not the current engine operating condition is in the estimated octane number learning control mode, i.e., whether or not the current engine operating condition is a learning control mode of the estimated octane number. In short, this is a discrimination for determining whether or not the engine is in a stable operating condition.

Figure 20:
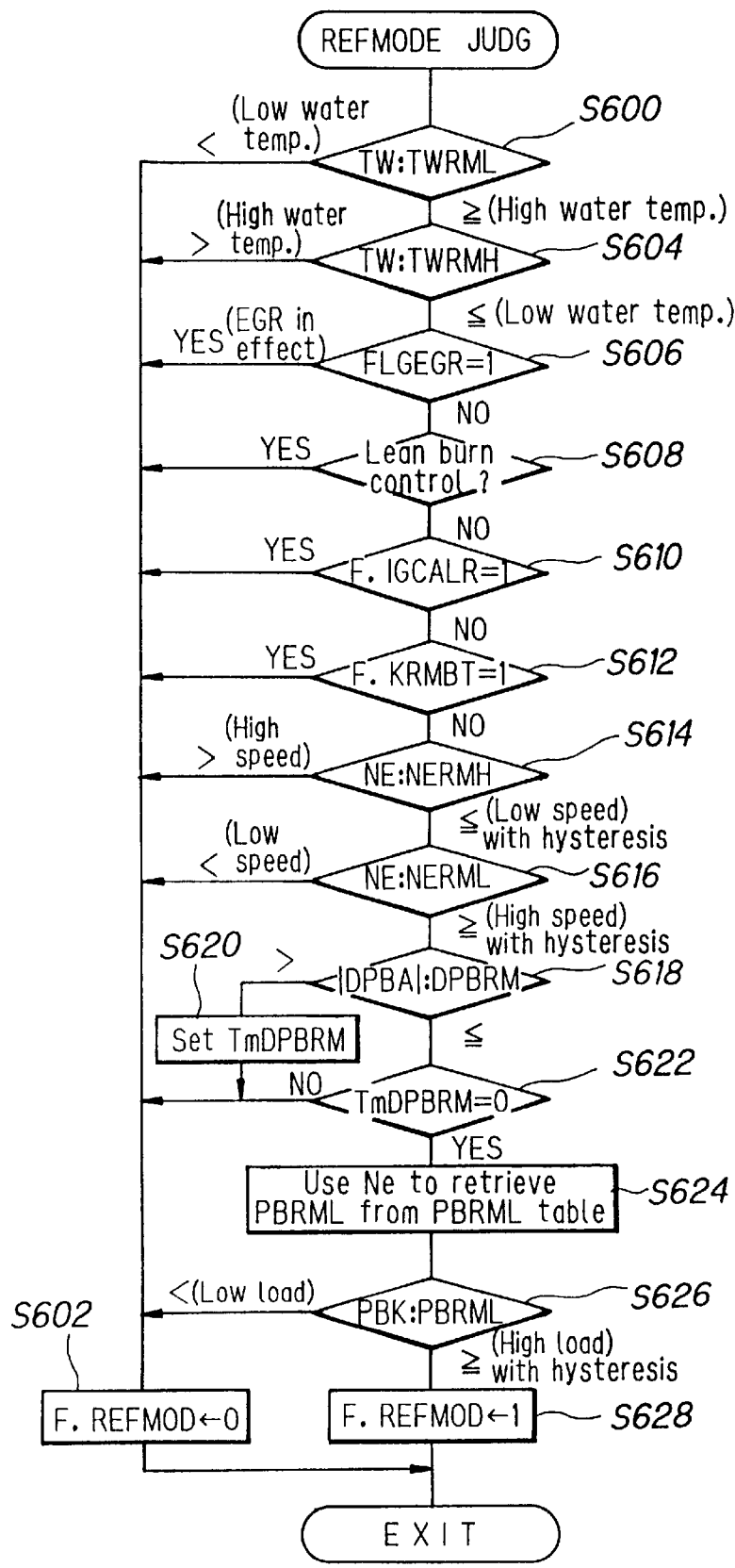
FIG. 20 is a flow chart showing the subroutine of the main flow chart for discriminating if the current engine operating condition is a learning control mode.

FIG. 20 shows a subroutine for this task. In S600 the detected coolant temperature TW is compared with a prescribed value TWRML (e.g. 10° C.) and if it is smaller, a flag F.REFMOD is set to 0 in S602. This means that no learning operation is to be conducted because the engine operating condition is not in the learning region.

If the detected coolant temperature is found to be at or above the prescribed value in S600, it is compared with a second prescribed value TWRMH (e.g. 98° C.) in S604. If it is found to be higher than the prescribed value, the aforesaid processing of S602 is conducted. If the detected coolant temperature is found to be at or below the prescribed value in S604, a check is made in S606 as to whether or not the bit of a flag FLGEGR is set to 1. The bit of this flag is set to 1 when EGR (exhaust gas recirculation) control is in effect in another routine (not shown). If the result in S606 is affirmative, S602 is executed. If it is negative, a discrimination is made in S608 as to whether or not the desired air-fuel ratio has been set on the lean side by an air-fuel ratio control routine (not shown), i.e., as to whether or not lean burn control is in effect. If the result in S608 is affirmative, S602 is executed.

If the result in S608 is negative, a check is made in S610 as to whether or not the bit of the flag F.IGCALR is set to 1, i.e., as to whether or not correction control for reducing the amount of ignition timing advance other than that for knocking correction is in effect. If the result in S610 is affirmative, S602 is executed. If it is negative, a check is made in S612 as to whether or not the bit of the flag F.KRMBT is set to 1. The bit of this flag is set to 1 in S524 of the flow chart of FIG. 17 when the learned estimated octane number is being controlled to within an upper limit value based on the MBT. If the result in S612 is affirmative, S602 is executed. If it is negative, the detected engine speed NE is compared with a prescribed value NERMH (upper engine speed limit of the estimated octane number learning mode; e.g., 3,000 rpm) in S614. If it is found that the detected engine speed exceeds the upper limit engine speed, S602 is executed. A learning operation is not conducted when KRMBT=1 because at this time the ignition timing is being controlled to within an MBT that is on the advance reduction side of the knocking limit. Learning operation is prohibited when the engine speed is higher than NERMH because at this time the noise level of the knocking sensor is unstable, making it impossible to discriminate slight knocking.

If the detected engine speed is found to be at or smaller than the upper limit engine speed in S614, the detected engine speed is compared with another prescribed value NERML (lower engine speed limit of the estimated octane number learning mode; e.g., 900 rpm) in S616. If the detected engine speed is found to be smaller than the lower limit engine speed, S602 is executed. If it is found that the detected engine speed is the same as or greater than the lower limit engine speed, the absolute value of the manifold absolute pressure difference DPBA (first-order difference between the value detected in the preceding cycle and that detected in the current cycle) is obtained and compared with a prescribed value DPBRM (e.g., 20 mm Hg) in S618. A difference (absolute value) exceeding the prescribed value indicates that the manifold absolute pressure is changing rapidly and that the engine is in a transient operating condition. In this case, therefore, a timer TmDPBRM (a down counter) is set to a prescribed value and started in S620, whereafter S602 is executed. If the difference (absolute value) is found to be equal to or smaller than the prescribed value in S618, a check is made in S622 as to whether or not the counter value is 0 and if the result is negative, S602 is executed. This is because the engine operating condition does not stabilize until some time has elapsed after the sudden change in manifold absolute pressure has subsided.

Figure 21:
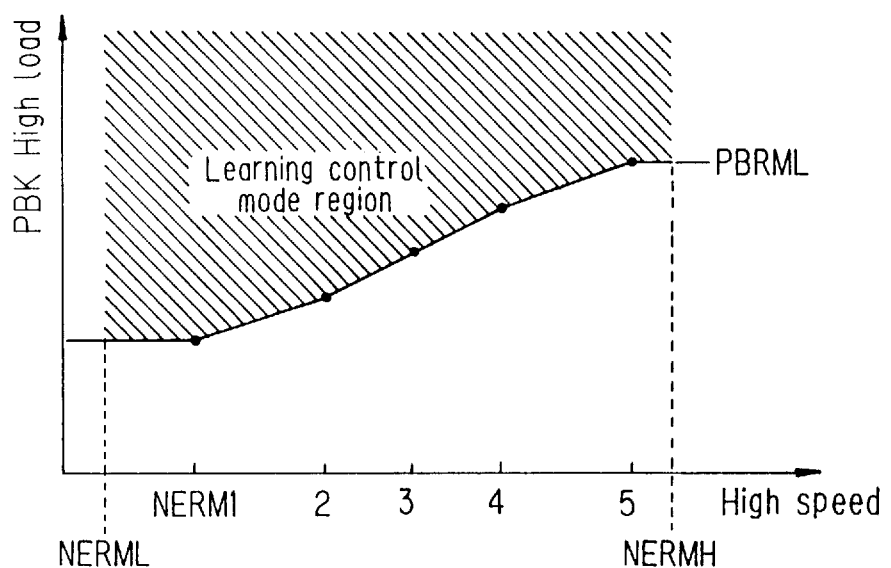
FIG. 21 is an explanatory view showing the characteristics of a value for discriminating a learning mode region referred to in FIG. 20.

If the counter value is found to be zero in S622, the detected engine speed NE is used to retrieve a prescribed value PBRML from a PBRML table in S624 and the retrieved value is compared with the altitude-corrected manifold absolute pressure PBK in S626. If the retrieved value is found to be equal to or greater than the value of PBK in S626, the engine is judged to be under high load and the bit of the flag F.REFMOD is set to 1 in S628 to indicate that the engine operating condition is in the learning control mode region. If the retrieved value is found to be smaller than the value of PBK, S602 is executed. FIG. 21 shows the characteristics of the PBRML table. Estimated octane number learning operation is conducted when it is judged that the engine operating condition is stable and in the high-load region indicated in the drawing.

Returning to the flow chart of FIG. 3, the learned estimated octane number is calculated in S24.

Figure 22:
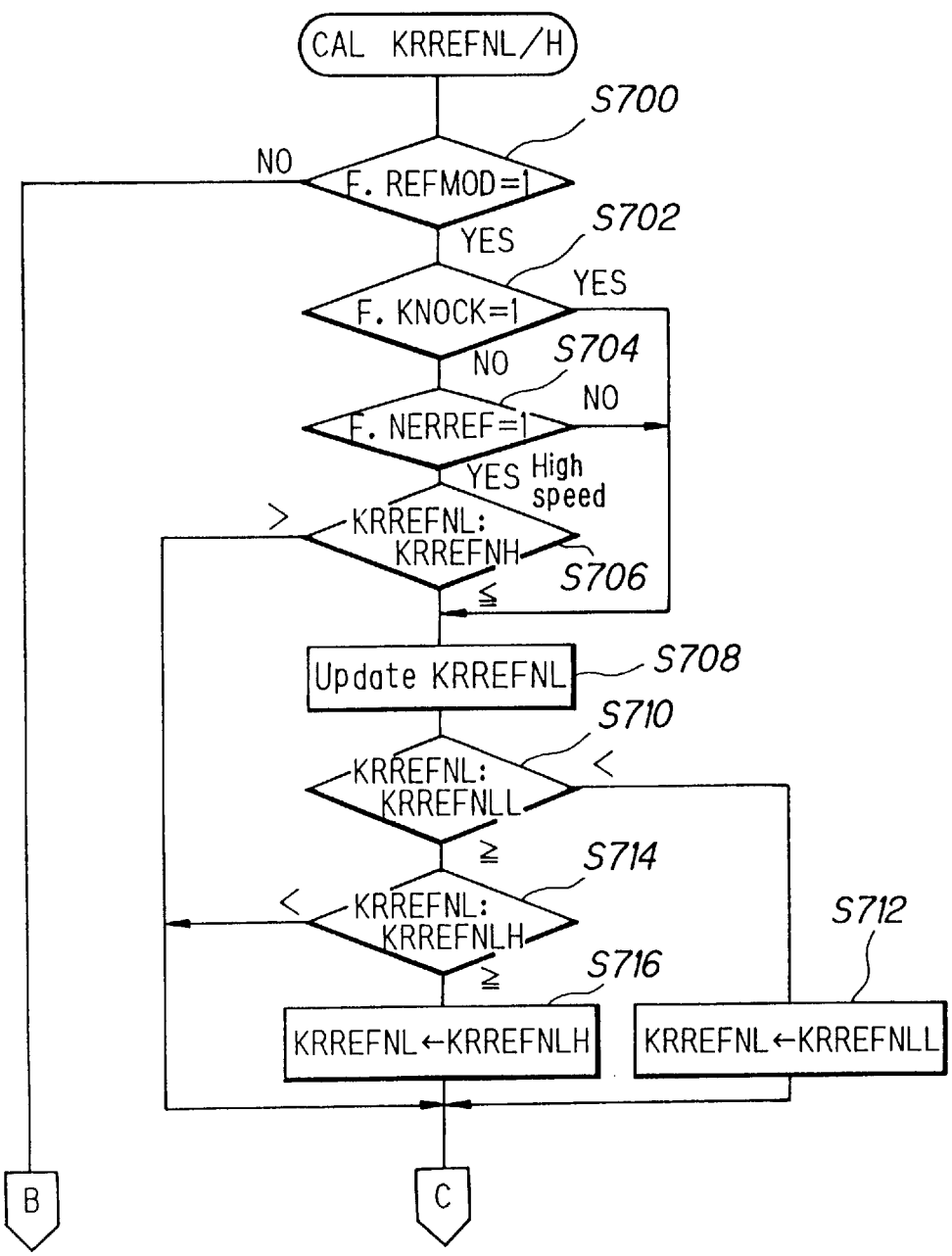
FIG. 22 is the first half of a flow chart showing the subroutine of the main flow chart for calculating a learned value of the estimated octane number.

FIG. 22 shows a subroutine for this task. In S700 a check is made as to whether or not the bit of the flag F.REFMOD is set to 1, i.e., as to whether or not the engine operating condition is in the learning mode region. If the result is affirmative, a check is made in S702 as to whether or not the bit of the flag F.KNOCK is set to 1, i.e., whether or not knocking has occurred.

If the result in S702 is negative, i.e. if it is found that knocking has not occurred, a check is made in S704 as to whether or not the bit of the flag F.NERREF (set in S432 of FIG. 16) is set to 1, i.e., whether or not the engine is operating in the high speed region. If the result is affirmative, the learned value for low-speed operation KRREFNL is compared with the learned value for high-speed operation KRREFNH in S706. If KRREFNH>KRON>KRREFNL, knocking has not occurred and NERREF=0 (low speed), then for preventing learning of KRREFNH on the low octane number side notwithstanding that knocking has not occurred, the learned value for low-speed operation KRREFNL is updated as follows in S708 when it is judged that the learned value for high-speed operation is equal to or greater than the learned value for low speed operation.

$$KRREFNL = CR \times KRON + (1-CR) \times KRREFNL$$

In other words, the learned value is updated by using the weighting coefficient CR to obtain the weighted average of the learned value and the estimated octane number KRON.

Next, the updated learned value KRREFNL is compared with a prescribed lower limit value KRREFNLL (of, say, 87 octane) in S710. If KRREFNL is smaller than the lower limit value, the learned value is set to the lower limit value in S712. If the learned value is equal to or greater than the lower limit value, the updated learned value is compared with a prescribed value KRREFNLH (of, say, 100 octane) in S714. If the updated learned value is equal to or greater than the prescribed value, the learned value is set to the upper limit value in S716. When S702 finds that knocking has occurred, S704 and S706 are skipped.

Figure 23:
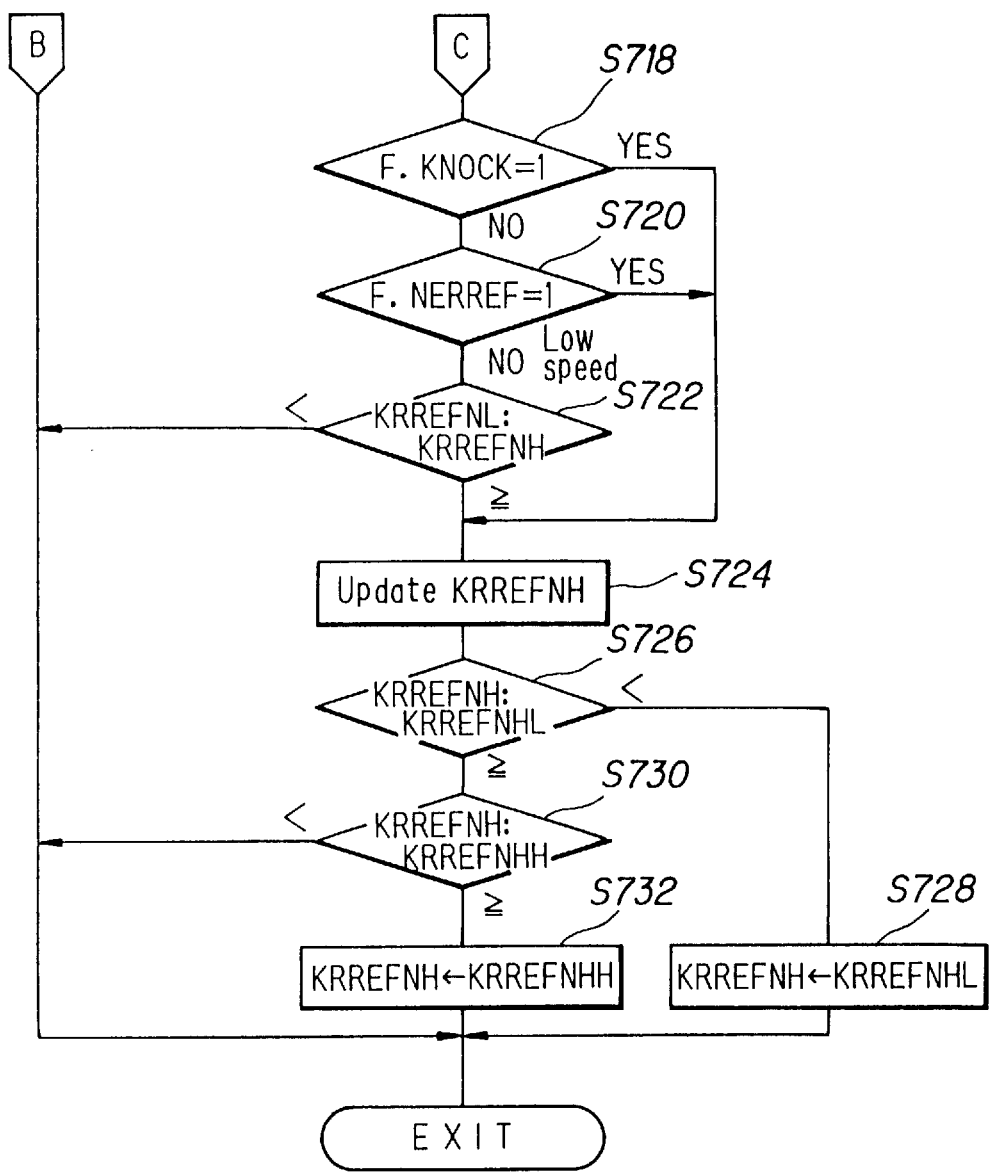
FIG. 23 is the last half of the flow chart of FIG. 22.

Next, in S718 of FIG. 23, a check is made as to whether or not the bit of the flag F.KNOCK is set to 1, i.e., another check is made as to whether or not knocking has occurred. If the result is negative, a check is made in S720 as to whether or not the bit of the flag F.NERREF is set to 1, i.e., whether or not the engine is operating in the high-speed region. If the result is negative, the learned value for low-speed operation KRREFNL is again compared with the learned value for high-speed operation KRREFNH in S722. If the learned value for low-speed operation is equal to or greater than the learned value for high speed operation, the learned value for high-speed operation is updated in S724 as follows.

$$KRREFNH = CR \times KRON + (1-KRON) \times KRREFNH$$

The reason for this is the same as that for updating the learned value for low-speed operation explained earlier. In the steps S726 to S732 which follow, the learned value for high-speed operation is compared with its lower limit value KRREFNHL (of, say, 87 octane) and its upper limit value KRREFNHH (of, say, 100 octane) and is limited to the lower limit value when it falls therebelow and to the upper limit value when it falls thereabove. When the result in S700 is negative, the subroutine is terminated.

Returning to the flow chart of FIG. 3, ignition timing θIG is calculated in the following manner in S26 based on the basic ignition timing θGBASE and the knock correction amount IGKNOCK.

$$\theta IG = \theta IGBASE + IGKNOCK$$

Other corrections such as for coolant temperature can also be appropriately included in the determination of the final ignition timing. As the method for including such corrections is well known and not directly related to the gist of this invention, however, it will not be explained here.

As will be understood from the foregoing description, the ignition timing control system according to this embodiment calculates the knocking correction amount IGKNOCK as the magnitude of the change in the ignition timing advance direction from the basic ignition timing θIGBASE. Moreover, in calculating the knock correction amount IGKNOCK, the final estimated octane number is set to the learned value if the estimated octane number KRON is found to equal the learned value KRREF or exceed it in the direction of ignition timing advance in S512 of FIG. 17, the advance rate KADV for the final estimated octane number is obtained in S528 or S530 of the same figure, and the knocking correction amount IGKNOCK is calculated in S532 of the same figure as the product of the advance rate KADV and the maximum advance amount ADVMAX. As shown in FIG. 6, therefore, the actual knock correction amount IGKNOCK (solid line curve) does not cross over the advance limit value (single-dot chain line) which is expected to be obtained if calculated from the learned estimated octane number.

Further, owing to the inclusion of S512 the knocking correction amount IGKNOCK (broken line curve in FIG. 6) expected to be obtained if calculated from the estimated octane number KRON does not exceed the advance limit based on the learned value and, as a result, the actual knocking correction amount IGKNOCK shown by the solid line curve is imparted with the minimum required advance characteristic, whereby the ignition timing can be optimally determine while simultaneously avoiding knocking.

In addition, since the procedures of S510 to S522 have the effect of determining the final estimated octane number so as not to exceed the MBT curve in the ignition timing advance direction, the knocking correction amount IGKNOCK does not exceed the MBT in the direction of ignition timing advance in FIG. 4. In other words, the characteristic curve of the basic ignition timing θIGBASE becomes as shown in FIG. 4.

As this embodiment is configured in the foregoing manner, the ignition timing can be determined based on the octane number of the fuel estimated from the state of engine knocking and the so-determined ignition timing can be prevented from exceeding the MBT in the ignition timing advance direction. As a result, there is no unnecessary loss of engine output. Since a learned value of the estimated octane number is obtained and the estimated octane number is prevented from exceeding the learned value in the ignition timing advance direction, moreover, the ignition timing can be set near the knocking limit so as to enable efficient utilization of engine output and to reliably prevent knocking.

Also, since the knocking discrimination level is increased with increasing octane number during knocking detection, erroneous knocking detection is prevented. Furthermore, as the manifold absolute pressure is corrected for altitude and the corrected value is used for calculating the estimated octane number, the system is unaffected by changes in the altitude at which the engine is operating.

While the manifold absolute pressure was used as the parameter indicating engine load in the foregoing description, it is possible to use the intake air volume instead.

In addition, while the knocking correction amount IGKNOCK is calculated in FIG. 17 on the assumption that the system is used in an engine having variable valve timing control, the embodiment is not limited to application to engines of this type but can also be utilized in engines without variable valve timing control. In such cases, it suffices to calculate a single maximum advance amount ADVMAX in S500 to S508.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling ignition timing of an internal combustion engine, comprising:

engine operating parameter detecting means for detecting operating parameters of the engine at least including engine speed and engine load;

knocking detecting means for detecting a combustion knocking occurring in the engine;

ignition timing control means, operatively coupled to said engine operating parameter detecting means and said knocking detecting means, for determining a final ignition timing to be supplied to the engine; and ignition means, operatively coupled to said ignition timing control means, for igniting an air-fuel mixture in the engine in response to the final ignition timing;

wherein said ignition timing control means including;

basic ignition timing determining means for determining a basic ignition timing IGBASE of the engine based on the detected engine operating parameters;

octane number estimating means for estimating octane number KRON of fuel being supplied to the engine based on the detected engine operating parameters and the detected combustion knocking;

octane number upper limit value calculating means for calculating an upper limit value KRMBT of the estimated fuel octane number KRON based on the detected engine operating parameters;

octane number determining means for comparing the estimated octane number KRON with the upper limit value KRMBT to determine a final fuel octane number KRACT in response to the estimated octane number KRON when the estimated octane number KRON is found to be at a side lesser than the upper limit value KRMBT in octane number, while determining the final fuel octane number KRACT in response to the upper limit value KRMBT when the estimated octane number KRON is found to be at a side greater than upper limit value KRMBT in octane number;

ignition timing correction amount calculating means for calculating an ignition timing correction amount IGKNOCK at least based on the determined final fuel octane number KRACT; and ignition timing determining means for correcting the basic ignition timing IGBASE at least by the ignition timing correction amount IGKNOCK to determine the final ignition timing θIG of the engine.

2. A system according to claim 1, wherein said ignition timing correction amount calculating means calculates the ignition timing correction amount IGKNOCK based on an advance rate KADV calculated in response to the determined final fuel octane number KRACT and a maximum advance amount ADVMAX.

3. A system according to claim 2, wherein said internal combustion engine is equipped with a variable valve timing mechanism, and the final fuel octane number KRACT is determined based on operation of the variable valve timing mechanism.

4. A system according to claim 3, wherein said internal combustion engine is equipped with a variable valve timing mechanism, and the maximum advance amount ADVMAX is determined based on operation of the variable valve timing mechanism.

5. A system according to claim 1, wherein the engine load is corrected for a parameter indicative of altitude where the engine is operating.

6. A system according to claim 5, wherein the parameter indicative of altitude is atmospheric pressure.

7. A system according to claim 1, wherein said knocking detecting means comprising:

knocking discrimination gain calculating means for calculating a knocking discrimination gain GAMP in response to the detected engine operating condition;

discrimination gain correction value calculating means for calculating a discrimination gain correction value KAGRON in response to the estimated fuel octane number KRON;

correcting means for correcting for the knocking discrimination gain GAMP by the calculated discrimination gain correction value KAGRON;

multiplying means for multiplying a knocking discrimination level VNOISE by the corrected knocking discrimination gain GAMP; and detecting means for detecting a combustion knocking occurring in the engine using the knocking discrimination level VNOISE.

8. A system according to any of preceding claims 3 to 7, wherein said engine operating condition detecting means detects at least one among state of engine transient, engine water coolant temperature, desired air-fuel ratio and state during which EGR is being in effect, and when at least one among them is at the specific condition, said octane number reference value calculating means calculates the learned value KRREF of the estimated fuel octane number KRON.

9. A system according to claim 1, wherein said ignition timing correction amount calculating means calculates the ignition timing correction amount IGKNOCK as a value which corrects the basic ignition timing IGBASE in an advance direction.

10. A system for controlling ignition timing of an internal combustion engine, comprising:

engine operating parameter detecting means for detecting operating parameters of the engine at least including engine speed and engine load;

knocking detecting means for detecting a combustion knocking occurring in the engine;

ignition timing control means, operatively coupled to said engine operating parameter detecting means and said knocking detecting means, for determining a final ignition timing to be supplied to the engine; and ignition means, operatively coupled to said ignition timing control means, for igniting an air-fuel mixture in the engine in response to the final ignition timing;

wherein said ignition timing control means including;

basic ignition timing determining means for determining a basis ignition timing IGBASE of the engine based on the detected engine operating parameters;

octane number estimating means for estimating octane number KRON of fuel being supplied to the engine based on the detected engine operating parameters and the detected combustion knocking;

learned estimated octane number calculating means for calculating a learned value KRREF of the estimated fuel octane number KRON when engine operation is operating under a specific condition;

octane number determining means for comparing the estimated octane number KRON with the learned value KRREF to determine a final fuel octane number KRACT in response to the estimated octane number KRON when the estimated octane number KRON is found to be at a side lesser than the learned value KRREF in octane number, while determining the final fuel octane number KRACT in response to the learned value KRREF when the estimated octane number KRON is found to be at a side greater than learned value KRREF in octane number;

ignition timing correction amount calculating means for calculating an ignition timing correction amount IGKNOCK at least based on the determined final fuel octane number KRACT; and ignition timing determining means for correcting the basic ignition timing IGBASE at least by the ignition timing correction amount IGKNOCK to determine the final ignition timing θGI of the engine.

11. A system according to claim 10, wherein said ignition timing correction amount calculating means calculates the ignition timing correction amount IGKNOCK based on an advance rate KADV calculated in response to the determined final fuel octane number KRACT and a maximum advance amount ADVMAX.

12. A system according to claim 10, wherein said internal combustion engine is equipped with a variable valve timing mechanism, and the final fuel octane number KRACT is determined based on operation of the variable valve timing mechanism.

13. A system according to claim 10, wherein said internal combustion engine is equipped with a variable valve timing mechanism, and the maximum advance amount ADVMAX is determined based on operation of the variable valve timing mechanism.

14. A system according to claim 10, wherein the engine load is corrected for a parameter indicative of altitude where the engine is operating.

15. A system according to claim 14, wherein the parameter indicative of altitude is atmospheric pressure.

16. A system according to claim 10, wherein said knocking detecting means comprising:
knocking discrimination gain calculating means for calculating a knocking discrimination gain GAMP in response to the detected engine operating condition;
discrimination gain correction value calculating means for calculating a discrimination gain correction value KAGRON in response to the estimated fuel octane number KRON;
correcting means for correcting for the knocking discrimination gain GAMP by the calculated discrimination gain correction value KAGRON;
multiplying means for multiplying a knocking discrimination level VNOISE by the corrected knocking discrimination gain GAMP; and
detecting means for detecting a combustion knocking occurring in the engine using the knocking discrimination level VNOISE.

17. A system according to claim 10, wherein said engine operating condition detecting means detects at least one among state of engine transient, engine water coolant temperature, desired air-fuel ratio and state during which EGR is being in effect, and when at least one among them is at the specific condition, said octane number reference value calculating means calculates the learned value KRREF of the estimated fuel octane number KRON.

18. A system according to claim 10, wherein said ignition timing correction amount calculating means calculates the ignition timing correction amount IGKNOCK as a value which corrects the basic ignition timing IGBASE in an advance direction.

19. A system for controlling ignition timing of an internal combustion engine, comprising:
engine operating parameter detecting means for detecting operating parameters of the engine at least including engine speed and engine load;
knocking detecting means for detecting a combustion knocking occurring in the engine;
ignition timing control means, operatively coupled to said engine operating parameter detecting means and said knocking detecting means, for determining a final ignition timing to be supplied to the engine; and
ignition means, operatively coupled to said ignition timing control means, for igniting an air-fuel mixture in the engine in response to the final ignition timing;
wherein said ignition timing control means including;
basic ignition timing determining means for determining a basic ignition timing IGBASE of the engine along a knocking limit RON87 of least octane number of fuel to be possibly supplied to the engine based on the detected engine operating parameters;
octane number estimating means for estimating octane number KRON of fuel being supplied to the engine based on the detected engine operating conditions and the detected combustion knocking;
octane number limit value calculating means for calculating an upper limit value KRMBT of the estimated fuel octane number KRON in accordance with MBT of the engine based on the detected engine operating parameters;
learned estimated octane number calculating means for calculating a learned value KRREF of the estimated fuel octane number KRON when the detected engine operating condition is at a specific condition;
octane number determining means for determining a final fuel octane number KRACT from the estimated fuel octane number KRON such that the final fuel octane number KRACT is lesser than the upper limit value KRMBT and the learned value KRREF in octane number;
maximum advance amount determining means for determining a maximum ignition timing advance amount ADVMAS along a knocking limit RON100 of a maximum octane number of fuel to be possibly supplied to the engine;
advance rate determining means for determining an ignition timing advance rate KADV;
ignition timing correction amount calculating means for calculating an ignition timing correction amount IGKNOCK by multiplying the maximum ignition timing advance amount ADVMAX by the ignition timing advance rate KADV; and
ignition timing determining means for correcting the basic ignition timing IGBASE at least by the ignition timing correction amount IGKNOCK to determine the final ignition timing θIG of the engine.

20. A system according to claim 19, wherein the ignition timing advance rate KADV is determined based on the final fuel octane number KRACT.

21. A system according to claim 20, wherein the ignition timing advance rate KADV varies on engine speed.

22. A system according to claim 19, wherein said internal combustion engine is equipped with a variable valve timing mechanism, and the final fuel octane number KRACT is determined based on operation of the variable valve timing mechanism.

23. A system according to claim 19, wherein said internal combustion engine is equipped with a variable valve timing mechanism, and the maximum advance amount ADVMAX is determined based on operation of the variable valve timing mechanism.

24. A system according to claim 19, wherein the engine load is corrected for a parameter indicative of altitude where the engine is operating.

25. A system according to claim 24, wherein the parameter indicative of altitude is atmospheric pressure.

26. A system according to claim 19, wherein said knocking detecting means comprising:
knocking discrimination gain calculating means for calculating a knocking discrimination gain GAMP in response to the detected engine operating condition;

discrimination gain correction value calculating means for calculating a discrimination gain correction value KAGRON in response to the estimated fuel octane number KRON;

correcting means for correcting for the knocking discrimination gain GAMP by the calculated discrimination gain correction value KAGRON;

multiplying means for multiplying a knocking discrimination level VNOISE by the corrected knocking discrimination gain GAMP; and detecting means for detecting a combustion knocking occurring in the engine using the knocking discrimination level VNOISE.

27. A system according to claim 19, wherein said engine operating condition detecting means detects at least one among state of engine transient, engine water coolant temperature, desired air-fuel ratio and state during which EGR is being in effect, and when at least one among them is at the specific condition, said octane number reference value calculating means calculates the learned value KRREF of the estimated fuel octane number KRON.

28. A system according to claim 27, wherein the learned value KRREF varies on engine speed.

29. A system according to claim 19, wherein said ignition timing correction amount calculating means calculates the ignition timing correction amount IGKNOCK as a value which corrects the basic ignition timing IGBASE in an advance direction.

30. A system for controlling ignition timing of an internal combustion engine, comprising:

engine operating parameter detecting means for detecting operating parameters of the engine at least including engine speed and engine load;

knocking detecting means for detecting a combustion knocking occurring in the engine;

ignition timing control means, operatively coupled to said engine operating parameter detecting means and said knocking detecting means, for determining a final ignition timing to be supplied to the engine; and ignition means, operatively coupled to said ignition timing control means, for igniting an air-fuel mixture in the engine in response to the final ignition timing;

wherein said ignition timing control means includes a controller performing the functions of 1) determining a basic ignition timing IGBASE of the engine based on the detected engine operating parameters;

2) estimating octane number KRON of fuel being supplied to the engine based on the detected engine operating parameters and the detected combustion knocking;

3) calculating an upper limit value KRMBT of the estimated fuel octane number KRON based on the detected engine operating parameters;

4) comparing the estimated octane number KRON with the upper limit value KRMBT to determine a final fuel octane number KRACT in response to the estimated octane number KRON when the estimated octane number KRON is found to be at a side lesser than the upper limit value KRMBT in octane number, while determining the final fuel octane number KRACT in response to the upper limit value KRMBT when the estimated octane number KRON is found to be at a side greater than upper limit value KRMBT in octane number;

5) calculating an ignition timing correction amount IGKNOCK at least based on the determined final fuel octane number KRACT; and 6) correcting the basic ignition timing IGBASE at least by the ignition timing correction amount IGKNOCK to determine the final ignition timing θIG of the engine.

31. A system according to claim 30, wherein said controller calculates the ignition timing correction amount IGKNOCK based on an advance rate KADV calculated in response to the determined final fuel octane number KRACT and a maximum advance amount ADVMAX.

32. A system according to claim 31, wherein said internal combustion engine is equipped with a variable valve timing mechanism, and the final fuel octane number KRACT is determined based on operation of the variable valve timing mechanism.

33. A system according to claim 32, wherein said internal combustion engine is equipped with a variable valve timing mechanism, and the maximum advance amount ADVMAX is determined based on operation of the variable valve timing mechanism.

34. A system according to claim 30, wherein the engine load is corrected for a parameter indicative of altitude where the engine is operating.

35. A system according to claim 34, wherein the parameter indicative of altitude is atmospheric pressure.

36. A system according to claim 30, wherein said knocking detecting means includes said controller performing the functions of calculating a knocking discrimination gain GAMP in response to the detected engine operating parameters;

calculating a discrimination gain correction value KAGRON in response to the estimated fuel octane number KRON;

correcting for the knocking discrimination gain GAMP by the calculated discrimination gain correction value KAGRON;

multiplying a knocking discrimination level VNOISE by the corrected knocking discrimination gain GAMP; and detecting a combustion knocking occurring in the engine using the knocking discrimination level VNOISE.

37. A system according to any of preceding claims 32 to 36, wherein said engine operating parameter detecting means detects a specific condition from a plurality of conditions, said plurality of conditions including engine transients, engine coolant temperature being a predetermined temperature, a desired air-fuel ratio is a predetermined air-fuel ratio and an EGR is in effect, and when the engine is operating under the specific condition, said controller calculates the learned value KRREF of the estimated fuel octane number KRON.

38. A system according to claim 30, wherein said controller calculates the ignition timing correction amount IGKNOCK as a value which corrects the basic ignition timing IGBASE in an advance direction.

39. A system for controlling ignition timing of an internal combustion engine, comprising:

engine operating parameter detecting means for detecting operating parameter of the engine at least including engine speed and engine load;

knocking detecting means for detecting a combustion knocking occurring in the engine;

ignition timing control means, operatively coupled to said engine operating parameter detecting means and said knocking detecting means, for determining a final ignition timing to be supplied to the engine; and ignition means, operatively coupled to said ignition timing control means, for igniting an air-fuel mixture in the engine in response to the final ignition timing;

wherein said ignition timing control means including a controller performing the functions of
1) determining a basis ignition timing IGBASE of the engine based on the detected engine operating parameters;
2) estimating octane number KRON of fuel being supplied to the engine based on the detected engine operating parameters and the detected combustion knocking;
3) calculating a learned value KRREF of the estimated fuel octane number KRON when engine operation is operating under a specific condition;
4) comparing the estimated octane number KRON with the learned value KRREF to determine a final fuel octane number KRACT in response to the estimated octane number KRON when the estimated octane number KRON is found to be at a side lesser than the learned value KRREF in octane number, while determining the final fuel octane number KRACT in response to the learned value KRREF when the estimated octane number KRON is found to be at a side greater than learned value KRREF in octane number;
5) calculating an ignition timing correction amount IGKNOCK at least based on the determined final fuel octane number KRACT; and
6) correcting the basic ignition timing IGBASE at least by the ignition timing correction amount IGKNOCK to determine the final ignition timing θIG of the engine.

40. A system according to claim 39, wherein said controller calculates the ignition timing correction amount IGKNOCK based on an advance rate KADV calculated in response to the determined final fuel octane number KRACT and a maximum advance amount ADVMAX.

41. A system according to claim 39, wherein said internal combustion engine is equipped with a variable valve timing mechanism, and the final fuel octane number KRACT is determined based on operation of the variable valve timing mechanism.

42. A system according to claim 39, wherein said internal combustion engine is equipped with a variable valve timing mechanism, and the maximum advance amount ADVMAX is determined based on operation of the variable valve timing mechanism.

43. A system according to claim 39, wherein the engine load is corrected for a parameter indicative of altitude where the engine is operating.

44. A system according to claim 43, wherein the parameter indicative of altitude is atmospheric pressure.

45. A system according to claim 39, wherein said knocking detecting means includes said controller performing the functions of
calculating a knocking discrimination gain GAMP in response to the detected engine operating parameters;
calculating a discrimination gain correction value KAGRON in response to the estimated fuel octane number KRON;
correcting for the knocking discrimination gain GAMP by the calculated discrimination gain correction value KAGRON;
multiplying a knocking discrimination level VNOISE by the corrected knocking discrimination gain GAMP; and
detecting a combustion knocking occurring in the engine using the knocking discrimination level VNOISE.

46. A system according to claim 39, wherein said engine operating parameter detecting means detects a specific condition from a plurality of conditions including engine transients, engine coolant temperature being a predetermined temperature, a desired air-fuel ratio being a predetermined air-fuel ratio and an EGR being in effect, and when the engine is operating under the specific condition, said controller calculates the learned value KRREF of the estimated fuel octane number KRON.

47. A system according to claim 39, wherein said controller calculates the ignition timing correction amount IGKNOCK as a value which corrects the basic ignition timing IGBASE in an advance direction.

48. A system for controlling ignition timing of an internal combustion engine, comprising:
engine operating parameter detecting means for detecting operating parameters of the engine at least including engine speed and engine load;
knocking detecting means for detecting a combustion knocking occurring in the engine;
ignition timing control means, operatively coupled to said engine operating parameter detecting means and said knocking means, for determining a final ignition timing to be supplied to the engine; and
ignition means, operatively coupled to said ignition timing control means, for igniting an air-fuel mixture in the engine in response to the final ignition timing;
wherein said ignition timing control means including a controller performing the functions of
1) determining a basis ignition timing IGBASE of the engine along a knocking limit RON87 of least octane number of fuel to be possibly supplied to the engine based on the detected engine operating parameters;
2) estimating octane number KRON of fuel being supplied to the engine based on the detected engine operating parameters and the detected combustion knocking;
3) calculating an upper limit value KRMBT of the estimated fuel octane number KRON in accordance with MBT of the engine based on the detected engine operating parameters;
4) calculating a learned value KRREF of the estimated fuel octane number KRON when engine operation is operating under a specific condition;
5) determining a final fuel octane number KRACT from the estimated fuel octane number KRON such that the final fuel octane number KRACT is lesser than the upper limit value KRMBT and the learned value KRREF in octane number;
6) determining a maximum ignition timing advance amount ADVMAS along a knocking limit RON100 of a maximum octane number of fuel to be possibly supplied to the engine;
7) determining an ignition timing advance rate KADV;
8) calculating an ignition timing correction amount IGKNOCK by multiplying the maximum ignition timing advance amount ADVMAX by the ignition timing advance rate KADV; and
9) correcting the basic ignition timing IGBASE at least by the ignition timing correction amount IGKNOCK to determine the final ignition timing θIG of the engine.

49. A system according to claim 48, wherein the ignition timing advance rate KADV is determined based on the final fuel octane number KRACT.

50. A system according to claim 49, wherein the ignition timing advance rate KADV varies on engine speed.

51. A system according to claim 48, wherein said internal combustion engine is equipped with a variable valve timing mechanism, and the final fuel octane number KRACT is determined based on operation of the variable valve timing mechanism.

52. A system according to claim 48, wherein said internal combustion engine is equipped with a variable valve timing mechanism, and the maximum advance amount ADVMAX is determined based on operation of the variable valve timing mechanism.

53. A system according to claim 48, wherein the engine load is corrected for a parameter indicative of altitude where the engine is operating.

54. A system according to claim 53, wherein the parameter indicative of altitude is atmospheric pressure.

55. A system according to claim 48, wherein said knocking detecting means includes said controller performing the functions of calculating a knocking discrimination gain GAMP in response to the detected engine operating parameters;

calculating a discrimination gain correction value KAGRON in response to the estimated fuel octane number KRON;

correcting for the knocking discrimination gain GAMP by the calculated discrimination gain correction value KAGRON;

multiplying a knocking discrimination level VNOISE by the corrected knocking discrimination gain GAMP; and detecting a combustion knocking occurring in the engine using the knocking discrimination level VNOISE.

56. A system according to claim 48, wherein said engine operating parameter detecting means detects a specific condition from a plurality of conditions including engine transients, engine coolant temperature being a predetermined temperature, a desired air-fuel ratio being a predetermined air-fuel ratio and an EGR being in effect, and when the engine is operating under the specific condition, said controller calculates the learned value KRREF of the estimated fuel octane number KRON.

57. A system according to claim 56, wherein the learned value KRREF varies on the engine speed.

58. A system according to claim 49, wherein said controller calculates the ignition timing correction amount IGKNOCK as a value which corrects the basic ignition timing IGBASE in an advance direction.

* * * * *

UNITED STATES PATENT AND TRADEMARK OFFICE
CERTIFICATE OF CORRECTION

PATENT NO. : 5,845,620

DATED : December 8, 1998

INVENTOR(S) : Miyashita et al.

It is certified that error appears in the above-identified patent and that said Letters Patent is hereby corrected as shown below:

Column 17, line 4, delete "θGI" insert therefor -- θIG --

Column 18, line 12, delete "conditions" insert therefor -- parameters --

Signed and Sealed this

Thirteenth Day of July, 1999

Attest:

Q. TODD DICKINSON

Attesting Officer

Acting Commissioner of Patents and Trademarks